(12) United States Patent
Horikawa

(10) Patent No.: US 10,731,821 B2
(45) Date of Patent: Aug. 4, 2020

(54) VEHICLE LAMP HAVING A PLATE SHAPED LIGHT GUIDE BODY

(71) Applicant: Koito Manufacturing Co., Ltd., Tokyo (JP)

(72) Inventor: Akihito Horikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/295,632

(22) Filed: Mar. 7, 2019

(65) Prior Publication Data

US 2019/0285242 A1 Sep. 19, 2019

(30) Foreign Application Priority Data

Mar. 14, 2018 (JP) .................................. 2018-046372
Sep. 13, 2018 (JP) .................................. 2018-171966

(51) Int. Cl.
*F21S 43/239* (2018.01)
*F21S 43/237* (2018.01)

(52) U.S. Cl.
CPC ........... *F21S 43/239* (2018.01); *F21S 43/237* (2018.01)

(58) Field of Classification Search
CPC ........ F21S 43/239; F21S 43/237; F21S 43/14; F21S 43/245; F21S 43/243; F21S 43/249; F21S 43/251; F21S 43/241; G02B 6/0036
See application file for complete search history.

(56) References Cited

U.S. PATENT DOCUMENTS

| | | | | |
|---|---|---|---|---|
| 7,290,906 B2 * | 11/2007 | Suzuki | ................. | B60Q 1/2696 362/511 |
| 7,322,729 B2 * | 1/2008 | Nagabuchi | ........... | G02B 6/0018 362/327 |
| 8,814,391 B2 * | 8/2014 | Koh | ...................... | G02B 6/0021 313/512 |
| 9,242,594 B2 * | 1/2016 | Nakada | .................. | G02B 6/002 |
| 2006/0050282 A1 * | 3/2006 | de Lamberterie | ... | G02B 6/0055 356/452 |
| 2006/0164839 A1 * | 7/2006 | Stefanov | .............. | G02B 6/0018 362/327 |
| 2013/0003397 A1 * | 1/2013 | Buisson | .................. | F21S 43/14 362/511 |
| 2014/0211493 A1 * | 7/2014 | Ichikawa | .............. | F21V 7/0025 362/511 |
| 2019/0203905 A1 * | 7/2019 | Ichinohe | ............... | F21S 43/239 |

FOREIGN PATENT DOCUMENTS

JP 2013-016386 A 1/2013

* cited by examiner

*Primary Examiner* — Tracie Y Green
(74) *Attorney, Agent, or Firm* — Abelman, Frayne & Schwab

(57) ABSTRACT

A vehicle lamp includes a light source and a plate-shaped light guide body. The plate-shaped light guide body is configured to totally reflect light from the light source that is incident on the plate-shaped light guide body by a plurality of reflective elements formed on a first plate surface of the plate-shaped light guide body, and then, to emit the light from a second plate surface of the plate-shaped light guide body toward the front side of the vehicle lamp. The plurality of reflective elements are disposed in a state of being continuously arranged along a line extending in a required direction. Each of the reflective elements has a substantially concave spherical surface shape or a substantially convex spherical surface shape.

18 Claims, 16 Drawing Sheets

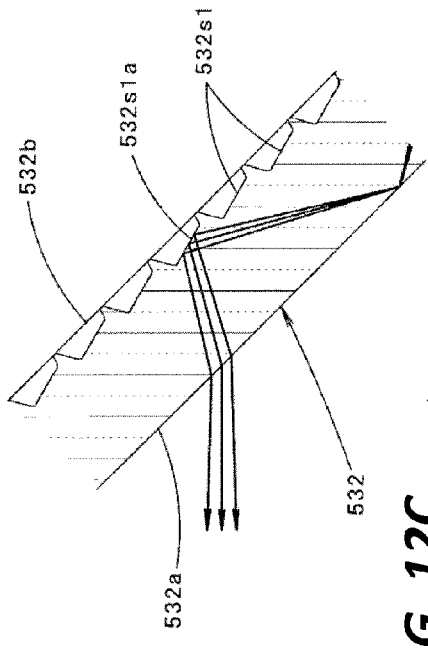
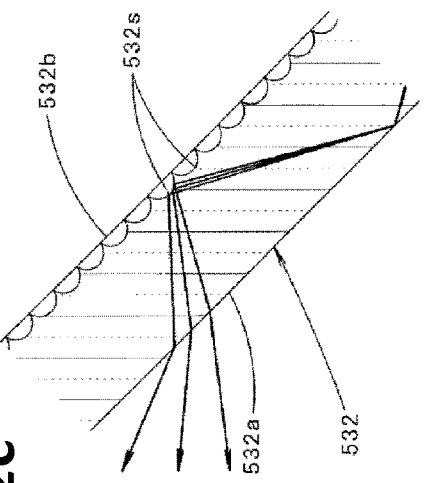
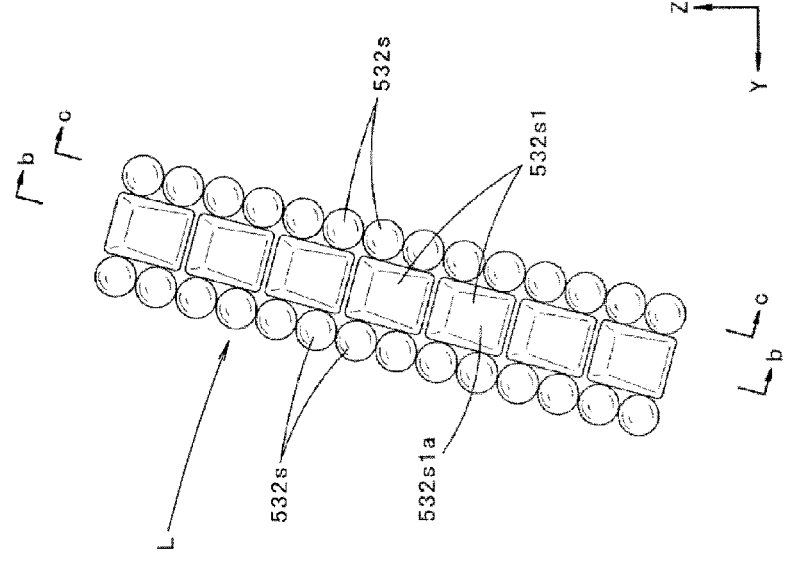
FIG. 12A
FIG. 12B
FIG. 12C

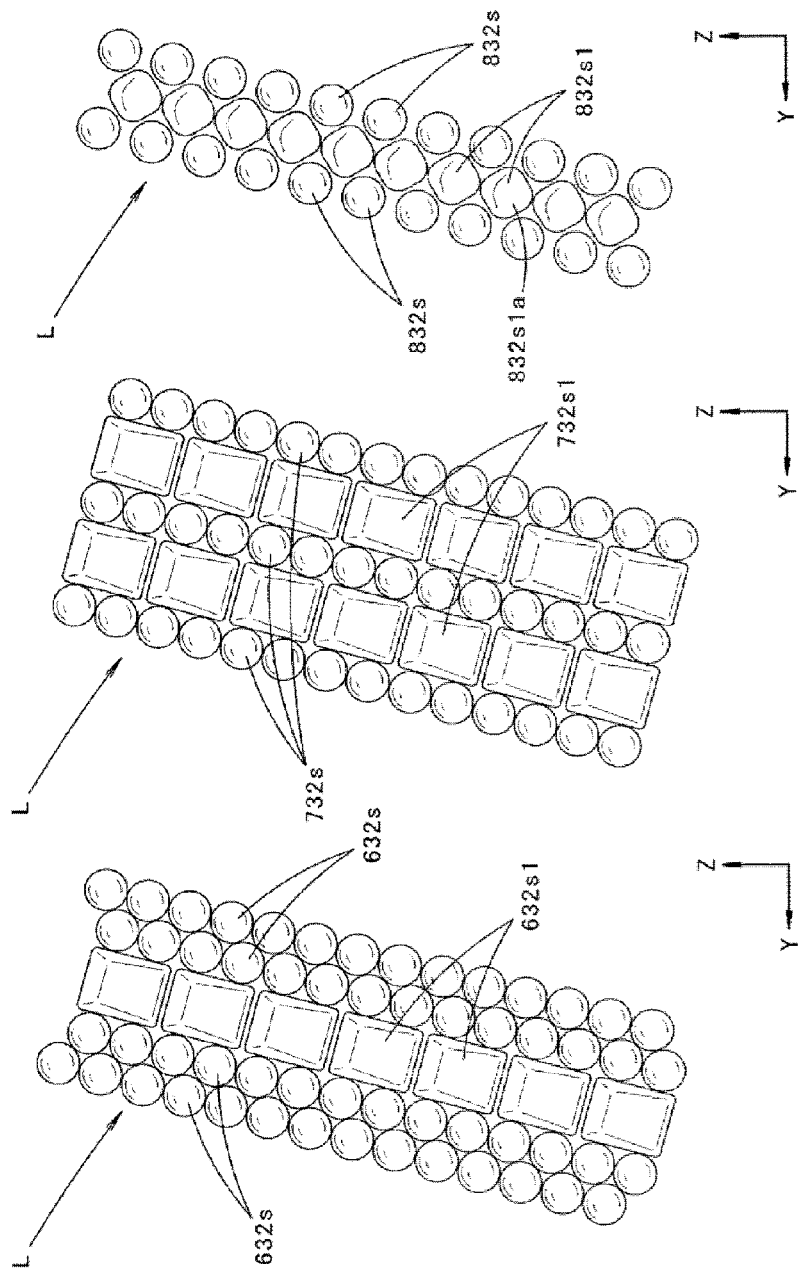

VEHICLE LAMP HAVING A PLATE SHAPED LIGHT GUIDE BODY

CROSS-REFERENCE TO RELATED APPLICATIONS

This application is based on and claims priority from Japanese Patent Application Nos. 2018-046372 and 2018-171966, filed on Mar. 14, 2018, and Sep. 13, 2018, respectively, with the Japan Patent Office, the disclosures of which are incorporated herein in their entireties by reference.

TECHNICAL FIELD

The present disclosure relates to a vehicle lamp including a plate-shaped light guide body.

BACKGROUND

A vehicle lamp has been known in the related art which is configured to totally reflect light from a light source that is incident on a plate-shaped light guide body by a plurality of reflective elements formed on a first plate surface of the plate-shaped light guide body, and then, to emit the light from a second plate surface of the plate-shaped light guide body toward the front side of the lamp.

Japanese Patent Laid-Open Publication No. 2013-016386 discloses a vehicle lamp configured to cause emitted light from a plurality of light sources disposed along a rear end surface of a plate-shaped light guide body to be incident on the plate-shaped light guide body from the rear end surface thereof.

SUMMARY

With a configuration disclosed in Japanese Patent Laid-Open Publication No. 2013-016386, it is possible to make a plate-shaped light guide body appear to emit light substantially uniformly when viewed from the front of the lamp.

Meanwhile, when an optical fiber of a side surface light emitting type is provided as a vehicle lamp, it is possible to enhance design property at the time of turning ON a lamp by causing the optical fiber to emit light linearly. However, it is difficult to realize the specific structure to cause the emitted light from a light source to be incident on the optical fiber from the end surface of the optical fiber.

On the other hand, in a vehicle lamp including a plate-shaped light guide body, it is possible to realize a linear light emission when a configuration in which a fine groove-shaped reflective element is formed on a plate surface of a rear side of the lamp, a configuration in which a plurality of reflective elements are formed in a serial disposition, or a configuration in which an embossing processing is performed on a plate surface of a front side of the lamp are used as a configuration of the plate-shaped light guide body.

However, a direction of the line of sight in which the plate-shaped light guide body appears to emit light linearly is limited in the two-former configurations, and it is not possible to secure sufficient brightness in the last configuration. Therefore, a light emission method as in an optical fiber is not possible to realize, and thus, the design property at the time of turning ON the lamp is not possible to be enhanced.

The present disclosure has been made in consideration of the circumstances and, the present disclosure is to provide a vehicle lamp able to enhance design property at the time of turning ON the lamp, in a vehicle lamp including a plate-shaped light guide body.

The present disclosure facilitates the achievement of the above-described object by considering the configuration of the plate-shaped light guide body.

That is, the vehicle lamp according to the present disclosure is a vehicle lamp including a light source and a plate-shaped light guide body. The plate-shaped light guide body is configured to totally reflect light from the light source that is incident on the plate-shaped light guide body by a plurality of reflective elements formed on a first plate surface of the plate-shaped light guide body, and then, to emit the light from a second plate surface of the plate-shaped light guide body toward a front side of the vehicle lamp. The plurality of reflective elements are disposed in a state of being continuously arranged along a line extending in a required direction. Each of the reflective elements has a substantially concave spherical surface or a substantially convex spherical surface.

A type of the "light source" is not particularly limited, and examples thereof include a light emitting diode or an incandescent bulb.

The specific shape is not particularly limited as long as the "plate-shaped light guide body" is configured to totally reflect light from a light source that is incident on a plate-shaped light guide body by a plurality of reflective elements formed on a first plate surface of the plate-shaped light guide body, and then, to emit the light from a second plate surface of the plate-shaped light guide body toward the front of the lamp.

The specific direction of the "required direction" is not particularly limited.

The "state of being continuously arranged along a line" includes, of course, a state where the plurality of reflective elements are closely adhered to each other, but, also includes a state where the plurality of reflective elements are slightly separated from each other as long as the plate-shaped light guide body is within in a range in which the plate-shaped light guide body appears to emit light linearly by the light from the light source that is totally reflected by the plurality of reflective elements.

The "substantially concave spherical surface shape" refers to a concave-curved surface shape having a spherical surface or a shape close thereto (e.g., an elliptic spherical surface, a polyhedron).

The "substantially convex spherical surface shape" refers a convex-curved surface shape having a spherical surface or a shape close thereto (e.g., an elliptic spherical surface, a polyhedron).

A vehicle lamp according to the present disclosure is configured to totally reflect light from the light source that is incident on the plate-shaped light guide body by a plurality of reflective elements formed on a first plate surface of the plate-shaped light guide body, and then, to emit the light from a second plate surface of the plate-shaped light guide body toward the front of the lamp, but the plurality of reflective elements are disposed in a state of being continuously arranged along a line extending in a required direction, and each of the reflective elements has a substantially concave spherical surface shape or a substantially convex spherical surface shape. Thus, the following operational effect may be obtained.

That is, since the plurality of reflective elements are disposed on the first plate surface of the plate-shaped light guide body in a state of being continuously arranged along the lines, it is possible to make the plate-shaped light guide body appear to emit light linearly along the lines by totally reflecting the light from the light source that is incident on the plate-shaped light guide body from each of the reflective elements and emitting from the second plate surface toward the front of the lamp.

At this time, since each of the reflective elements formed on the first plate surface of the plate-shaped light guide body has a substantially concave spherical surface shape or a substantially convex spherical surface shape, the total reflecting at the reflective element is performed substantially uniformly toward all directions. Therefore, it is possible to maintain the state where the plate-shaped light guide body appears to emit light linearly along the lines even when the direction of the line of sight at the time of observing the plate-shaped light guide body is largely changed. Therefore, it is possible to make an optical fiber appear to emit light at the time of turning ON the lamp (that is, at the time of turning ON the light source). Thus, the design property of the vehicle lamp may be enhanced.

As described above, according to the present disclosure, it is possible to enhance the design property at the time of turning ON the lamp in the vehicle lamp including the plate-shaped light guide body.

At this time, a width of a line may be set to a value of about 0.25 to 2 mm in order to make the plurality of reflective elements disposed along the line appear as if an optical fiber emits light at the time of turning ON the lamp.

Further, each of the reflective elements may be formed in a substantially concave spherical surface shape or in a substantially convex spherical surface shape. However, it may be formed in the substantially concave spherical surface shape because the total reflection efficiency at the reflective element may be increased as compared with the case where the reflective element is formed in the substantially convex spherical surface shape.

In the above configuration, when the plurality of reflective elements are disposed in a state of being arranged in parallel for plural numbers on the line in a direction that intersects with the required direction, it is possible to make the line appear to emit light with more uniform brightness.

At this time, the number of reflective element arranged in parallel may be set to about 2 to 10 from the viewpoint of achieving both uniform light emission of the line and processing accuracy of the surface shape of the reflective element.

In the above configuration, when at least a region where the plurality of reflective elements are formed is formed in a curved surface shape as the first plat surface, it is easily possible to dispose the line so as to extend in a three-dimensionally curved manner. And thus, it is possible to enhance the produced effect on the design property that makes an optical fiber appear to emit light at the time of turning ON the lamp.

In the above configuration, when a plurality of lines are disposed at intervals in the direction that intersects with the required direction, it is possible to make optical fibers of the plurality of lines appear to emit light in a state of being discretely disposed at the time of turning ON the lamp. Thus, the produced effect on the design property may be further enhanced.

At this time, the interval between the lines in the required direction may be set to a value larger than the width of the line, in order to enhance the effect of appearing to emit light in a state where optical fibers of the plurality of lines are discretely disposed.

In the above configuration, after the bar-shaped light guide body is provided, the bar-shaped light guide body is disposed in a state of extending along an end surface of the plate-shaped light guide body in the required direction, the light source is disposed so as to cause light to be incident on the bar-shaped light guide body, and further, the bar-shaped light guide body is configured to cause the light from the light source that is incident on the bar-shaped light guide body is incident on the plate-shaped light guide body from the end surface in the required direction. Then, the following operational effect may be obtained.

That is, the degree of freedom of disposition of the light source may be enhanced by adopting a configuration in which the light from the light source is caused to be incident on the plate-shaped light guide body through the bar-shaped light guide body. Further, by adopting such a configuration, even when a plurality of lines are disposed at intervals in the direction that intersects with the required direction, it is possible to make the light from the light source reach efficiently the plurality of reflective elements disposed along the plurality of lines.

In the above configuration, when the light source and the plate-shaped light guide body are disposed in a plurality of pairs at intervals in a front-rear direction of the lamp, a portion that appears to emit light linearly along the line exists at a plurality of positions in the front-rear direction of the lamp in each plate-shaped light guide body. Thus, it is possible to display a light emission state having feeling of depth at the time of turning ON the lamp.

In the above configuration, after a second light source and a second bar-shaped light guide body are provided and the plate-shaped light guide body includes a front end surface and a rear end surface serving as end faces in a direction that intersects with the required direction, the second bar-shaped light guide body is disposed in a state of extending along the rear end surface of the plate-shaped light guide body, the second light source is disposed so as to cause light to be incident on the second bar-shaped light guide body, and further, the second bar-shaped light guide body is configured to cause the light from the second light source that is incident on the second bar-shaped light guide body is incident on the plate-shaped light guide body from the rear end surface and the plate-shaped light guide body is configured to emit the light from the second light source that is incident on the plate-shaped light guide body from the front end surface toward the front of the lamp. Then, the following operational effect may be obtained.

That is, when the lamp is turned ON, it is possible to make the plate-shaped light guide body appear to emit light linearly along the line and to make the front end surface of the plate-shaped light guide body appear like a band shape by simultaneously turning ON the light source and the second light source. Thus, the design property of the vehicle lamp may be further enhanced.

In the above configuration, further, after a plurality of auxiliary reflective elements are disposed on the first plate surface of the plate-shaped light guide body in a state of being continuously arranged along the line at positions adjacent to the plurality of reflective elements disposed along the line, the plurality of auxiliary reflective elements are formed in a stepped manner with respect to the required direction. Then, the following operational effect may be obtained.

That is, since the plurality of auxiliary reflective elements are additionally disposed on the first plate surface of the plate-shaped light guide body in a state of being continuously arranged along the lines, it is possible to make emitted light have directionality when the light from the light source that is incident on the plate-shaped light guide body is totally reflected from each of the auxiliary reflective elements and emitted from the second plate surface toward the front of the lamp. Thus, it is easily possible to enhance the light distribution performance as the vehicle lamp.

At this time, since the plurality of auxiliary reflective elements are disposed along the line at positions adjacent to the plurality of reflective elements disposed along the line, it is possible to maintain the produced effect on the design property that makes an optical fiber appear to emit light at the time of turning ON the lamp, and additionally, to enhance the light distribution performance as the vehicle lamp.

In a case where such a configuration is adopted, when the plurality of auxiliary reflective elements arranged along the line are disposed in a state of being sandwiched from both sides in the direction that intersects with the required direction by the plurality of reflective elements arranged along the line, it is possible to enhance the produced effect on the design property that makes an optical fiber appear to emit light at the time of turning ON the lamp, and additionally, to enhance the light distribution performance as the vehicle lamp.

Further, in a case where such a configuration is adopted, when the plurality of reflective elements and the plurality of auxiliary reflective elements adjacent to each other on the line are disposed in a state of being shifted by a half pitch of the reflective elements with respect to the required direction, it is possible to suppress the width of the line from being widened due to the additional arrangement of the plurality of auxiliary reflective elements on the line.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a front view illustrating the lamp unit in a state where the lamp is turned ON.

FIG. 12A is a view illustrating a XIIa portion of FIG. 11 viewed from a rear side of the lamp, FIG. 12B is a cross-sectional view taken along a line b-b of FIG. 12A, and FIG. 12C is a cross-sectional view taken along a line c-c of FIG. 12A.

FIGS. 13A to 13C are views illustrating a first modification to a third modification of the second embodiment, which are similar to FIG. 12A.

FIG. 15A is a view illustrating a cross-sectional shape of an auxiliary reflective element, and FIG. 15B is a view illustrating a cross-sectional shape of a reflective element.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

First, a first embodiment of the present disclosure will be described.

Figure 1:
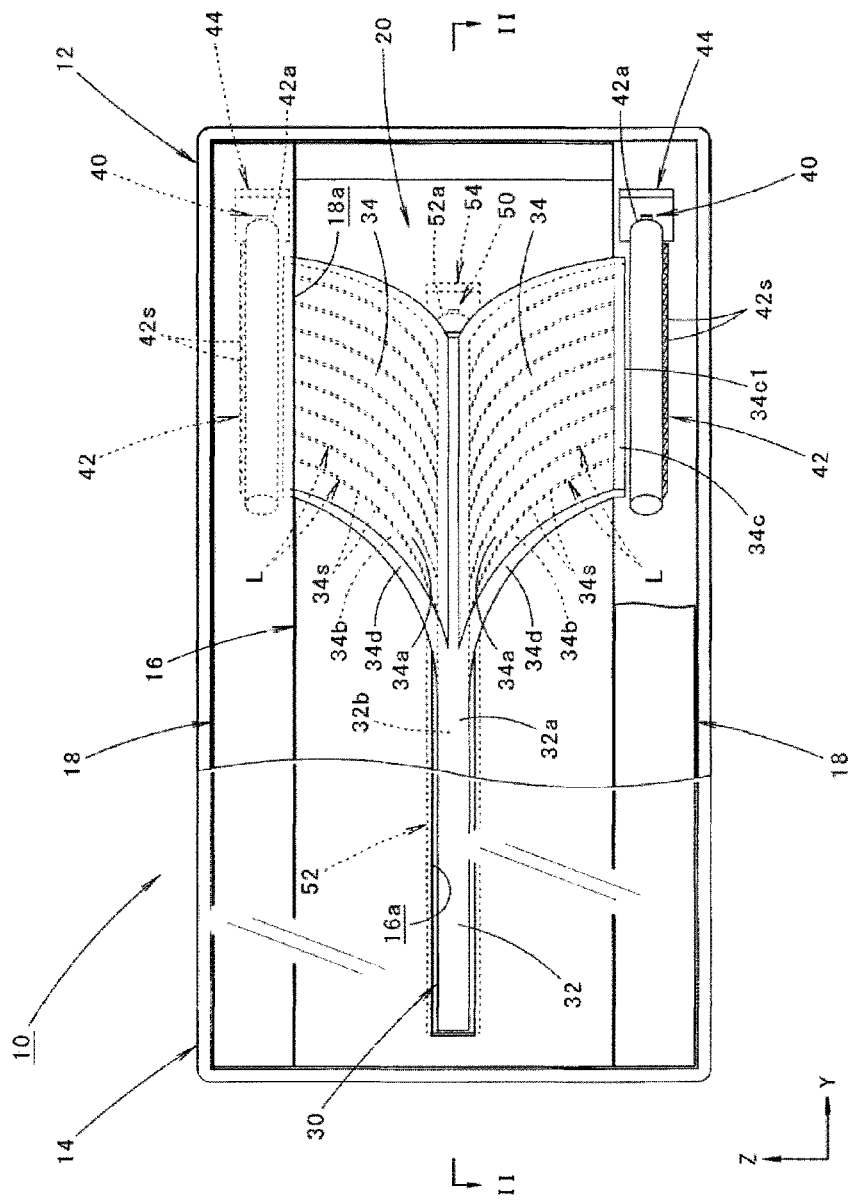
FIG. 1 is a front view illustrating a vehicle lamp according to a first embodiment of the present disclosure.
Figure 2:
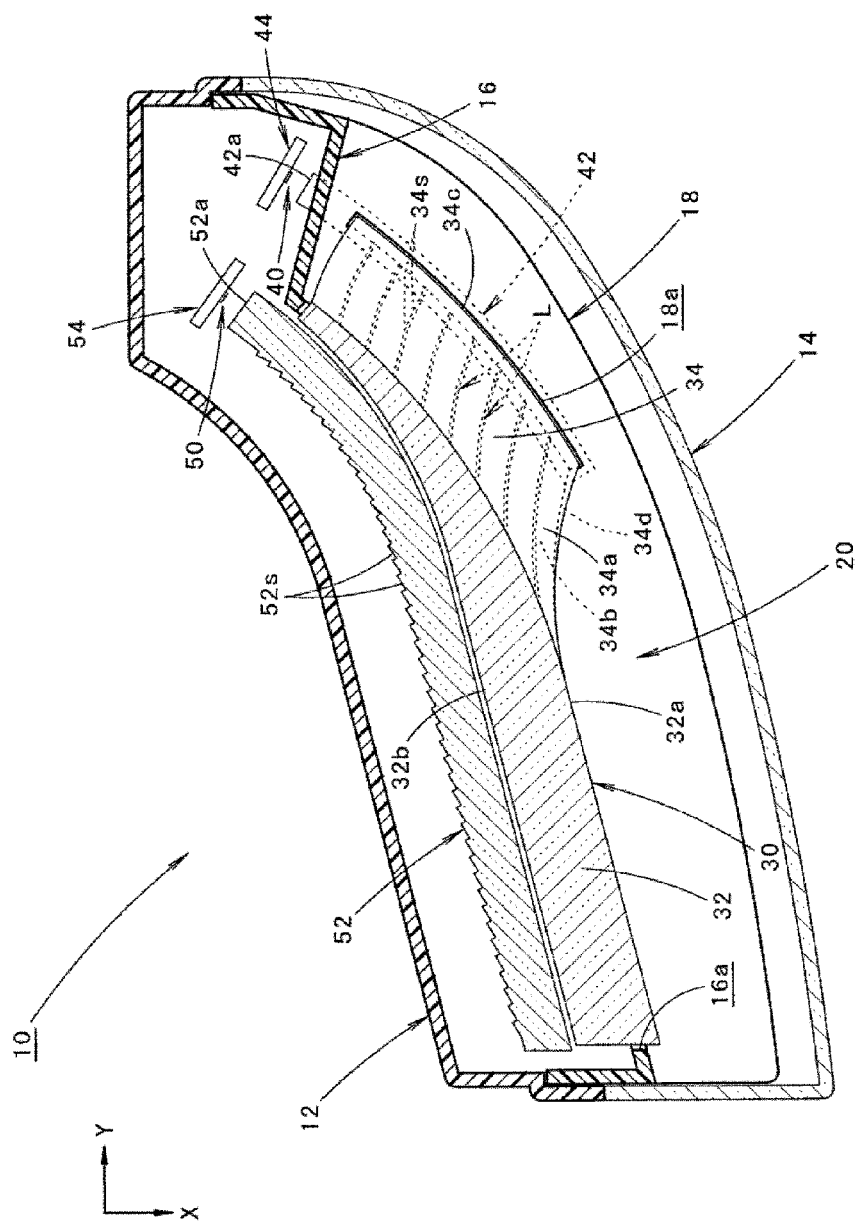
FIG. 2 is a sectional view taken along a line II-II of FIG. 1.

FIG. 1 is a front view illustrating a vehicle lamp 10 according to the embodiment, and FIG. 2 is a cross-sectional view taken along a line II-II of FIG. 1.

In the drawings, a direction indicated by X refers "front" for the vehicle lamp 10 ("rear" for the vehicle), a direction indicated by Y refers "right side direction" (also "right side direction" for the vehicle), and a direction indicated by Z refers "upper direction." This is also applied to other drawings.

The vehicle lamp 10 according to the embodiment is a tail lamp disposed at the right side rear end portion of the vehicle and is configured such that a lamp unit 20 is incorporated in a lamp chamber formed by a lamp body 12 and a translucent cover 14 that is attached to the front end opening thereof and is transparent.

The translucent cover 14 is formed to wrap around to the rear side of the lamp from the left end portion thereof toward the right end portion.

Figure 3:
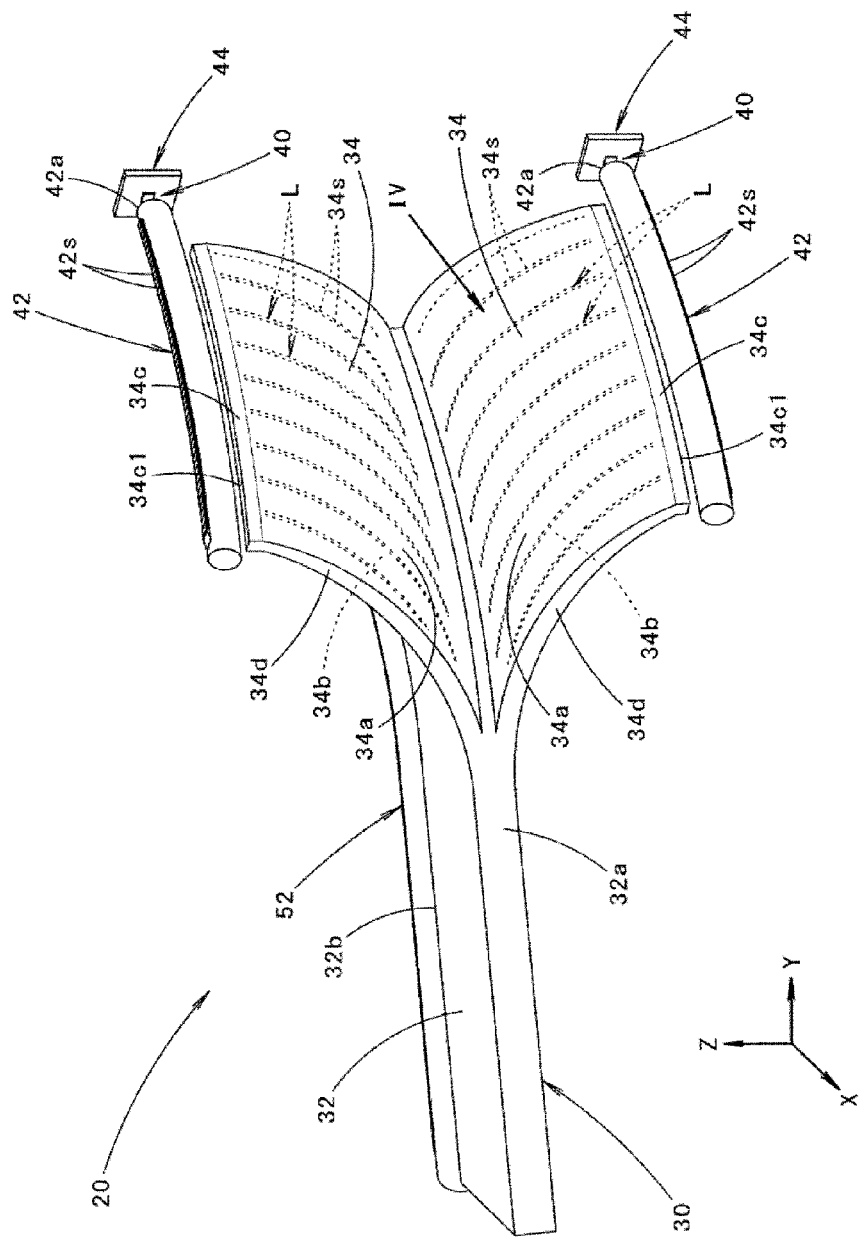
FIG. 3 is a perspective view illustrating a lamp unit of the vehicle lamp.

FIG. 3 is a perspective view illustrating a lamp unit 20 taken out.

As illustrated in the drawing, the lamp unit 20 includes a plate-shaped light guide body 30, a pair of upper and lower light sources 40, and a bar-shaped light guide body 42, and a second light source 50 and a second bar-shaped light guide body 52. The lamp unit 20 has a vertically symmetrical configuration.

The plate-shaped light guide body 30 is a member made of transparent resin (e.g., acrylic resin), and is supported by the lamp body 12 by a support structure (not illustrated). The plate-shaped light guide body 30 is configured to include a flat plate portion 32 that extends in a vehicle width direction along a horizontal plane, and a pair of upper and lower curved portions 34 that extend from the flat plate portion 32.

The flat plate portion 32 is formed to have a constant front and rear width in the left half portion thereof, but is formed to have the front and rear width that is gradually narrowed toward the right edge in the right half portion thereof. That is, a front end surface 32a of the flat plate portion 32 is formed to extend obliquely to the rear side of the lamp from the left end portion thereof toward the right end portion, and the left half portion thereof is configured as a planar vertical surface, but the right half portion thereof is configured as a convex-curved surface-shaped vertical surface that is curved to the rear side of the lamp toward the right edge. Meanwhile, a rear end surface 32b of the flat plate portion 32 is configured as a planar vertical surface that extends in parallel with the left half portion of the front end surface 32a, but the right end portion is configured as a concave-curved surface-shaped vertical surface that is curved to the rear side of the lamp toward the right edge.

The pair of upper and lower curved portions 34 are formed to extend in a curved manner from the front end surface 32a of the flat plate portion 32 in both of upward and downward directions. That is, in each of the curved portions 34, a first plate surface 34b that constitutes the rear surface thereof is formed in a concave-curved surface shape, and a second plate surface 34a that constitutes the front surface thereof is formed in a convex-curved surface shape.

Specifically, the curved portion 34 positioned on the upper side is formed to extend upward with an inclination close to a horizontal direction in the upper region of the right half portion of the front end surface 32a of the flat plate portion 32, and then an upward angle is gradually increased. At this time, the curved portion 34 is formed such that the thickness is gradually decreased from the base end portion thereof toward the tip end portion, and a tip end edge portion 34c thereof is formed to extend along a vertical surface substantially parallel with the right half portion of the front end surface 32a. Further, a left end surface 34d of the curved portion 34 is formed to extend smoothly from the front end surface 32a of the flat plate portion 32.

A plurality of reflective elements 34s are formed on the first plate surface 34b of the curved portion 34. At this time, the plurality of reflective elements 34s are disposed in a state of being continuously arranged along lines L extending in a required direction.

The required direction is set in a direction from the base end portion of the curved portion 34 toward the tip end portion, and a line L is disposed to extend in a curved manner from the base end portion of the curved portion 34 to a position in the vicinity of the tip end edge portion 34c. A plurality (e.g., five to ten) of lines L are disposed substantially at equal intervals in a horizontal direction that intersects with the required direction (specifically, a direction in which the right half portion of the front end surface 32a of the flat plate portion 32 extends).

The curved portion 34 positioned on the lower side has the same configuration as that of the curved portion 34 positioned on the upper side.

The specific disposition and the specific shape of the plurality of reflective elements 34s in each of the curved portions 34 will be described later.

The pair of upper and lower light sources 40 and the bar-shaped light guide body 42 are disposed on both upper and lower sides of the pair of upper and lower curved portions 34.

The bar-shaped light guide body 42 positioned on the upper side is disposed to extend in a curved manner along a tip end surface 34c1 in the vicinity of the upper side of the tip end surface 34c1 (that is, an upper surface of the tip end edge portion 34c) of the curved portion 34 positioned on the upper side.

The bar-shaped light guide body 42 has a circular cross-sectional shape, and a plurality of reflective elements 4s are continuously formed in a longitudinal direction on the upper portion of the outer circumferential surface thereof. The bar-shaped light guide body 42 is supported by the lamp body 12 by the support structure (not illustrated).

The light source 40 positioned on the upper side is disposed in the vicinity of a right end surface 42a of the bar-shaped light guide body 42. The light source 40 is a red light emitting diode, and is mounted on a substrate 44 in a state where the emitting surface thereof faces the right end surface 42a of the bar-shaped light guide body 42. The substrate 44 is supported by the lamp body 12 by the support structure (not illustrated).

The bar-shaped light guide body 42 is configured to totally reflect light from the light source 40 that is incident on the right end surface 42a thereof by the plurality of reflective elements 42s while guiding the light toward the left end surface thereof and emit the light from the bar-shaped light guide body 42 toward the lower side, so as to be incident on the curved portion 34 of the plate-shaped light guide body 30 from the tip end surface 34c1 thereof.

Then, the curved portion 34 of the plate-shaped light guide body 30 is configured to totally reflect the light from the bar-shaped light guide body 42 that is incident on the tip end surface 34c1 thereof by the plurality of reflective elements 34s formed on the first plate surface 34b while guiding the light toward the base end portion of the curved portion 34, so as to emit from the second plate surface 34a toward the front of the lamp.

The light source 40 and the bar-shaped light guide body 42 positioned on the lower side are disposed in a state where the light source 40 and the bar-shaped light guide body 42 positioned on the upper side are vertically reversed.

The second light source 50 and the second bar-shaped light guide body 52 are disposed on the rear side of the lamp of the flat plate portion 32 of the plate-shaped light guide body 30.

The second bar-shaped light guide body 52 is disposed to extend along the rear end surface 32b in the vicinity of the rear of the lamp in the rear end surface 32b of the flat plate portion 32. The second bar-shaped light guide body 52 has a circular cross-sectional shape, and a plurality of reflective elements 52s are continuously formed in a longitudinal direction on the rear portion of the outer circumferential surface thereof. The second bar-shaped light guide body 52 is supported by the lamp body 12 by the support structure (not illustrated).

The second light source 50 is disposed in the vicinity of a right end surface 52a of the second bar-shaped light guide body 52. The second light source 50 is a red light emitting diode, and is mounted on a substrate 54 in a state where the emitting surface thereof faces the right end surface 52a of the second bar-shaped light guide body 52. The substrate 54 is supported by the lamp body 12 by the support structure (not illustrated).

The second bar-shaped light guide body 52 is configured to totally reflect light from the second light source 50 that is incident on the right end surface 52a thereof by the plurality of reflective elements 52s while guiding the light toward the left end surface thereof and emit the light from the second bar-shaped light guide body 52 toward the front of the lamp, so as to be incident on the flat plate portion 32 of the plate-shaped light guide body 30 from the rear end surface 32b thereof.

Then, the flat plate portion 32 of the plate-shaped light guide body 30 is configured to guide the light from the second bar-shaped light guide body 52 that is incident on the rear end surface 32b thereof to the front end surface 32a thereof and emit from the front end surface 32a toward the front of the lamp.

However, since the upper region and the lower region in the right half portion of the front end portion of the flat plate portion 32 are connected to the pair of upper and lower curved portions 34, a part of the light from the second bar-shaped light guide body 52 that is reached the front end surface 32a of the flat plate portion 32 is guided to the pair of upper and lower curved portions 34. Then, each of the curved portions 34 is configured to totally reflect the light from the second bar-shaped light guide body 52 that is incident on the base end surface thereof by the plurality of reflective elements 34s formed on the first plate surface 34b while guiding the light toward the tip end portion of the curved portion 34, so as to emit from the second plate surface 34a toward the front of the lamp.

As illustrated in FIGS. 1 and 2, an extension member 16 and a pair of upper and lower cover members 18 that partially covers the plate-shaped light guide body 30 of the lamp unit 20 are disposed in the lamp chamber.

The extension member 16 is configured as a panel-type member that covers the flat plate member 32 of the plate-shaped light guide body 30 at a position behind the pair of upper and lower curved portions 34 in the rear side of the lamp. An opening 16a having a laterally long rectangular shape that surrounds the flat plate portion 32 is formed in the extension member 16. The extension member 16 has a laterally long rectangular outer shape when viewed from the front of the lamp, and is supported by the lamp body 12 at both of the left and right ends.

The pair of upper and lower cover members 18 are configured as panel-type members that cover the pair of upper and lower bar-shaped light guide bodies 42 and light sources 40 and the tip end edge portion 34c of the pair of upper and lower curved portions 34 of the plate-shaped light guide body 30 at both upper and lower sides of the extension member 16. An opening 18a that extends in a substantially arc shape so as to surround the tip end edge portion 34c of the curved portion 34 is formed in each of the cover members 18. Each of the cover members 18 has a laterally long rectangular outer shape when viewed from the front of the lamp, and is supported by the extension member 16 or the lamp body 12.

Figure 4:
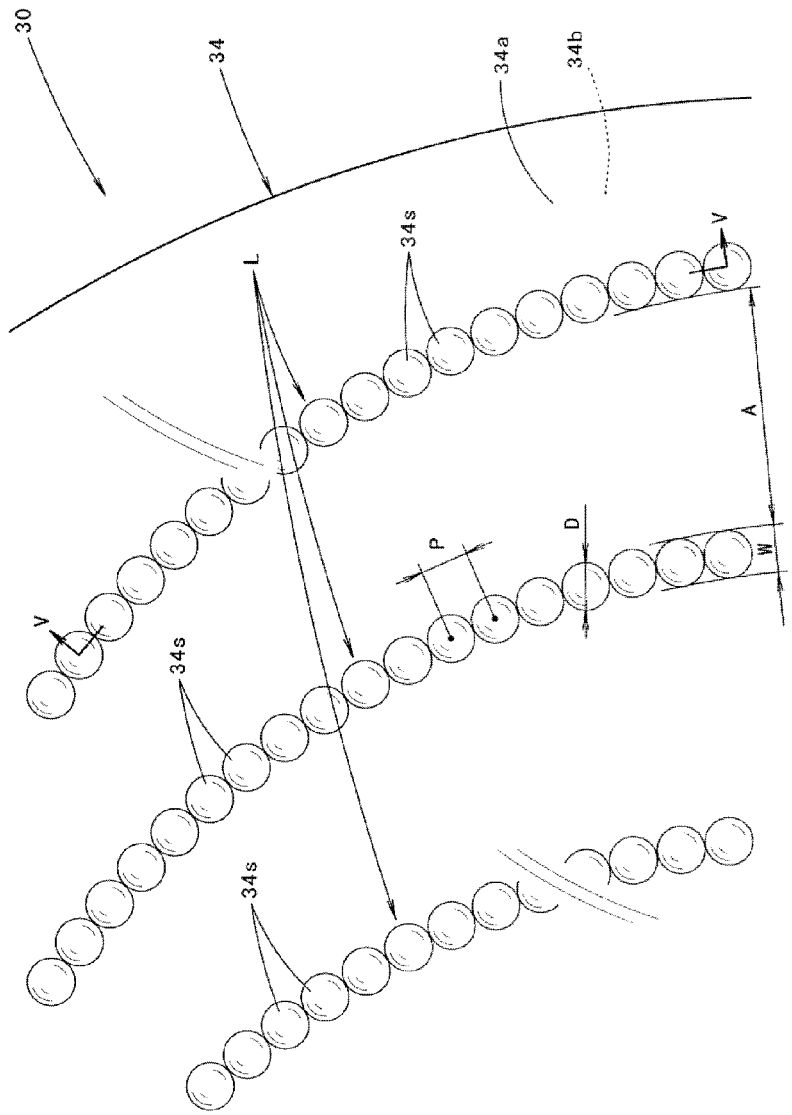
FIG. 4 is a view illustrating a main portion of a plate-shaped light guide body of the lamp unit, viewed in a direction of an arrow IV in FIG. 3.
Figure 5:
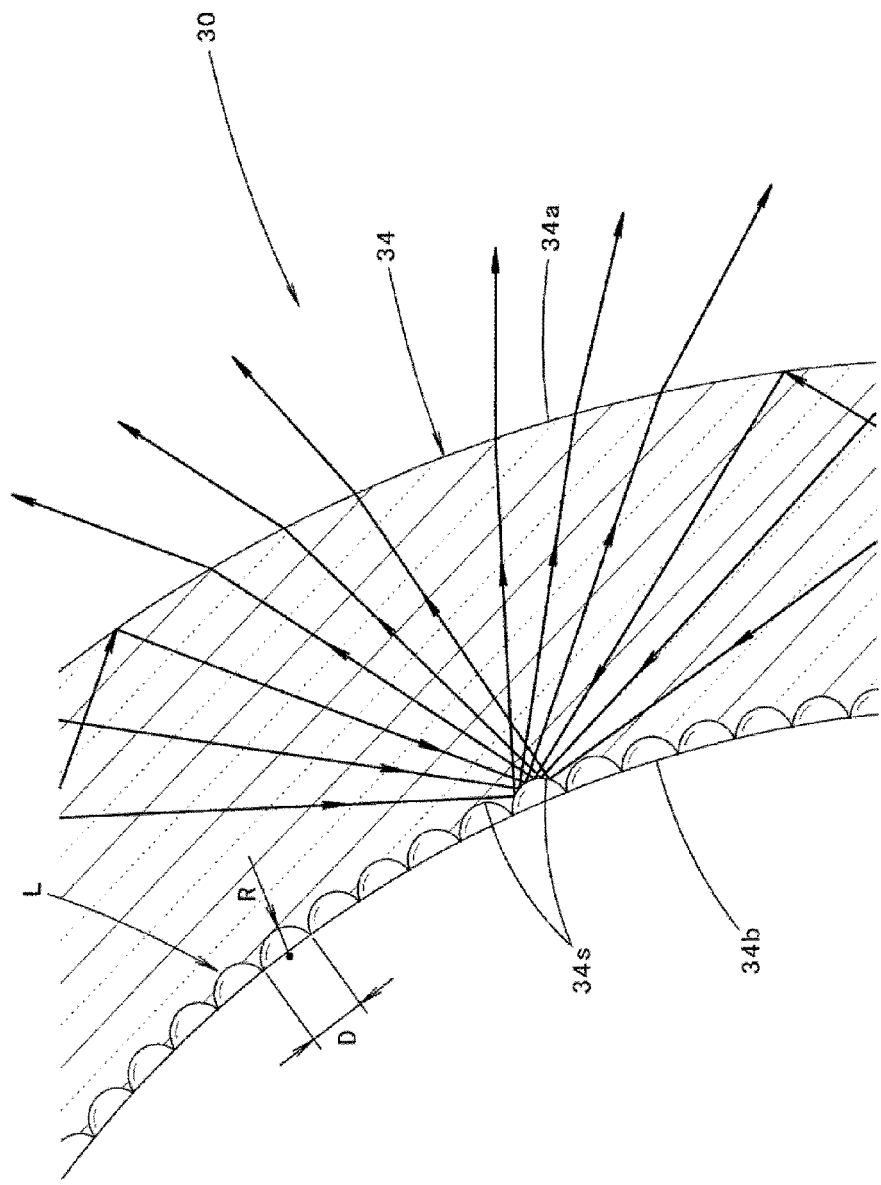
FIG. 5 is a sectional view taken along a line V-V of FIG. 4.

FIG. 4 is a view illustrating a main portion of the plate-shaped light guide body 30, viewed in a direction of an arrow IV in FIG. 3. Further, FIG. 5 is a cross-sectional view illustrating the main portion of the plate-shaped light guide body 30 along the line L, taken along a line V-V in FIG. 4.

As illustrated in the drawings, the plurality of reflective elements 34s formed on the first plate surface 34b of each of the curved portions 34 are disposed in a state of being continuously arranged in one row along each of the plurality of lines L. At this time, the plurality of reflective elements 34s are disposed in a state of being closely adhered to each other on each of the lines L.

Each of the reflective elements 34s has a surface shape of a concave spherical surface shape, and an outer peripheral edge shape thereof is set to a circular shape of the same size. At this time, an outer diameter D of each of the reflective elements 34s is set to a value that is substantially twice the radius R of the concave spherical surface (specifically, a value of D=about 0.25 to 2 mm (e.g., a value of about 1 mm)).

Therefore, each of the lines L has the same width W as the outer diameter D of each of the reflective elements 34s, and the plurality of reflective elements 34s are disposed in series at a pitch P which is the same as the outer diameter D of each of the reflective elements 34s.

An interval A between the plurality of lines L in the required direction is set to a value (e.g., A=about 2 W to 10 W) larger than the width W of each of the lines L.

As illustrated in FIG. 5, in the curved portion 34 positioned in the lower side, the light from the light source 40 is guided upward (that is, toward the base end side of the curved portion 34) and the light from the second light source 50 is guided downward (that is, toward the tip end side of the curved portion 34), and these lights reach each of the reflective elements 34s. At this time, since the lights from the light source 40 and the second light source 50 reach each of the reflective elements 34s from directions other than the directions in the cross section illustrated in FIG. 5, these lights are totally reflected in every direction by each of the reflective elements 34s and are emitted from the second plate surface 34a toward the front of the lamp. The same is also applied to the curved portion 34 positioned on the upper side.

Figure 6:
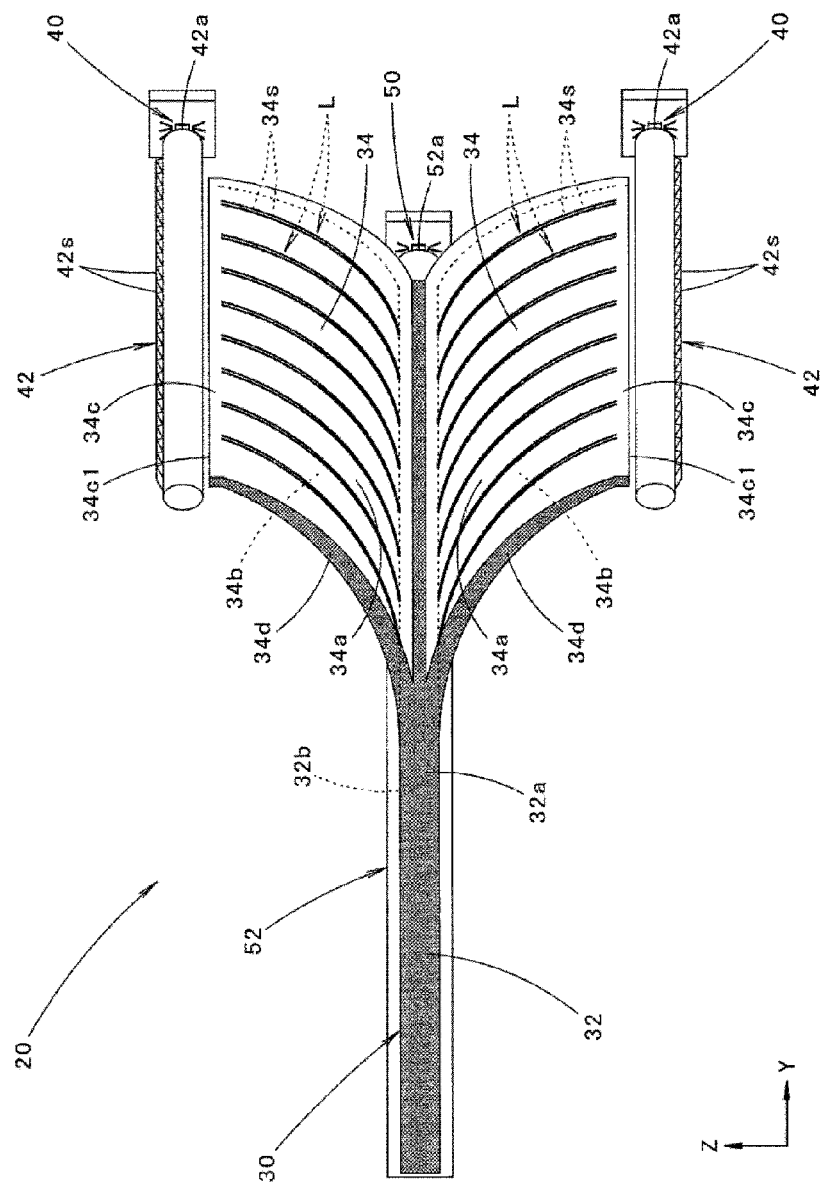

FIG. 6 is a front view illustrating a lamp unit 20 in a state where the lamp is turned ON.

As illustrated in the drawing, when the lamp unit 20 in a state where the pair of upper and lower light sources 40 and a second light source 50 are turned ON is observed from the front direction of the lamp (that is, from the rear of the vehicle), the front end surface 32a of the flat plate portion 32 of the plate-shaped light guide body 30 appears to emit light and the plurality of reflective elements 34s formed on the pair of upper and lower curved portions 34 appear to emit light.

Specifically, the front end surface 32a of the flat plate portion 32 appears to emit light by emitting the light from the second light source 50 that is incident on the rear end surface 32b thereof through the second bar-shaped light guide body 52 from the front end surface 32a toward the front of the lamp.

At this time, the front end surface 32 of the flat plate portion 32 appears to emit light with a wide width over the entire width in the vertical direction in the left half portion thereof, but a portion sandwiched between the base end portions of the pair of upper and lower curved portions 34 appears to emit light with a narrow width in the right half portion thereof.

Meanwhile, the plurality of reflective elements 34s formed on each of the curved portions 34 make each of the lines L appear to emit light substantially uniformly over the entire length by totally reflecting the light from the light source 40 that is incident on the tip end surface 34c1 of the curved portion 34 through the bar-shaped light guide body 42 by each of the reflective elements 34s while guiding to the base end portion, and further, make each of the lines L appear to emit light more brightly and more uniformly over the entire length by totally reflecting the light from the second light source 50 that is incident on the rear end surface 32b of the flat plate portion 32 through the second bar-shaped light guide body 52 by each of the reflective elements 34s while guiding from the base end portion of each of the curved portions 34 to the tip end side.

Further, at this time, the left end surface 34d of each of the curved portions 34 appears to emit light by making the light from the second light source 50 that is incident on the rear end surface 32b of the flat plate portion 32 through the second bar-shaped light guide body 52 reach the left end surface 34d while guiding from the base end portion of the curved portion 34 to the tip end side and emit toward the front of the lamp.

As described above, when the lamp unit 20 is observed from the front direction of the lamp, the plurality of reflective elements 34s formed on each of the curved portion 34 appears to emit light linearly along each of the plurality of lines L. However, each of the reflective elements 34s has a concave spherical surface shape. Thus, even in a case where the direction in which the lamp unit 20 is observed is shifted to a direction apart from the front direction of the lamp, the state where the plurality of reflective elements 34s appear to emit light along each of the plurality of lines L is maintained by totally reflecting the light from the light source 40 and the second light source 50 in every direction by each of the reflective elements 34s.

Next, the operational effects of the present embodiment will be described.

The vehicle lamp 10 according to the embodiment is configured to totally reflect the light from the light source 40 that is incident on each of the curved portions 34 of the plate-shaped light guide body 30 by the plurality of reflective elements 34s formed on the first plate surface 34b thereof, and then, to emit the light from the second plate surface 34a thereof toward the front of the lamp, but the plurality of reflective elements 34s are disposed in a state of being continuously arranged along the lines L extending in the required direction, and also, each of the reflective elements 34s has a substantially concave spherical surface shape. Therefore, the following operational effect may be obtained.

That is, since the plurality of reflective elements 34s are disposed on the first plate surface 34b of each of the curved portions 34 in a state of being continuously arranged along the lines L, it is possible to make each of the curved portions 34 appear to emit light linearly along the lines L by totally reflecting the light from the light source 40 that is incident on each of the curved portions 34 and emitting from the second plate surface 34a toward the front of the lamp.

At this time, since each of the reflective elements 34s formed on the first plate surface 34b of each of the curved portion 34 has a substantially concave spherical surface shape, the total reflection by the reflective elements 34s is substantially uniformly performed toward every direction. Therefore, it is possible to maintain the state where each of the curved portions 34 appears to emit light linearly along the lines L even when the direction of the line of sight at the time of observing the plate-shaped light guide body 30 is largely changed. Therefore, it is possible to make an optical fiber appear to emit light at the time of turning ON the lamp (that is, at the time of turning ON the light source 40). Thus, the design property of the vehicle lamp 10 may be enhanced.

As described above, according to the embodiment, it is possible to enhance the design property at the time of turning ON the lamp in the vehicle lamp 10 including the plate-shaped light guide body 30.

At this time, since the width of the line L is set to the value of about 0.25 to 2 mm in the present embodiment, it is possible to enhance the produced effect on the design property that the plurality of reflective elements 34s disposed along the line L appears as if an optical fiber emits light at the time of turning ON the lamp.

In the embodiment, since the first plate surface 34b is formed in a curved surface shape, the line L may be disposed to extend in a three-dimensionally curved manner. Therefore, it is possible to further enhance the produced effect on the design property that makes an optical fiber appear to emit light at the time of turning ON the lamp.

In addition, in the embodiment, since a plurality of lines L are disposed at intervals in the direction that intersects with the required direction, it is possible to make a plurality of optical fibers appear to emit light in a state of being discretely disposed at the time of turning ON the lamp. Thus the produced effect on the design property may be further enhanced.

At this time, in the embodiment, since the interval between the lines L in the required direction is set to a value larger than the width of the line L, it is possible to enhance the effect that a plurality of optical fibers appear to emit light in a state of being discretely disposed.

Further, the vehicle lamp 10 according to the embodiment includes the bar-shaped light guide body 40 as the lamp unit 20 thereof, the bar-shaped light guide body 40 is disposed in a state of extending along the tip end surface 34c1 (that is, the end surface in the required direction) of each of the curved portions 34, and the light source 40 is disposed so as to cause the light to be incident on the bar-shaped light guide body 42, and, the light from the light source 40 that is incident on the bar-shaped light guide body 42 is made to be incident on the curved portions 34 from the tip end surface 34c1. Therefore, the following operational effects may be obtained.

That is, the degree of freedom of disposition may be enhanced by adopting a configuration in which the light from the light source 40 is caused to be incident on each of the curved portions 34 through the bar-shaped light guide body 42. Further, by adopting such a configuration, even though a plurality of lines L are disposed at intervals in the direction that intersects with the required direction, it is possible to make the light from the light source 40 reach efficiently the plurality of reflective elements 34s disposed along the plurality of lines.

The vehicle lamp 10 according to the embodiment includes the second light source 50 and the second bar-shaped light guide body 52 as the lamp unit 20 thereof and the flat plate portion 32 of the plate-shaped light guide body 30 includes the front end surface 32a and the rear end surface 32b as end surfaces in the direction that intersects with the required direction, the second bar-shaped light guide body 52 is disposed in a state of extending along the rear end surface 32b of the flat plate portion 32 and the second light source 50 is disposed so as to cause the light to be incident on the second bar-shaped light guide body 52, and further, the light from the second light source 50 that is incident on the second bar-shaped light guide body 52 is incident on the flat plate portion 32 from the rear end surface 32b thereof and the light from the second light source 50 that is incident on the flat plate portion 32 is made to be emitted from the front end surface 32a toward the front of the lamp. Therefore, the following operational effects may be obtained.

That is, when the lamp is turned ON, it is possible to make each curved portions 34 of the plate-shaped light guide body 30 appear to emit light linearly along each of the plurality of lines L and to make the front end surface 32a of the flat plate portion 32 of the plate-shaped light guide body 30 appear like a band shape by simultaneously turning ON the light source 40 and the second light source 50. Thus, the design property of the vehicle lamp 10 may be further enhanced.

In addition, the plate-shaped light guide body 30 of the embodiment is formed to extend in a curved manner from the front end surface 32a of the flat plate portion 32 toward both of upward and downward directions. Therefore, when the lamp is turned ON, it is possible to make the front end surface 32a of the flat plate portion 32 appears to emit light as a bunch of optical fibers and the plurality of reflective elements 34s formed on the pair of upper and lower curved portions 34 appear to emit light as a plurality of optical fibers branched and extending from the bunch of optical fibers.

At this time, the plurality of reflective elements 34s formed on each of the curved portions 34 make each of the lines L appear to emit light more brightly and more uniformly over the entire length not only by totally reflecting the light from the light source 40 that is incident on the tip end surface 34c1 of the curved portion 34 through the bar-shaped light guide body 42 by each of the reflective elements 34s while guiding to the base end side, and further, but also by totally reflecting the light from the second light source 50 that is incident on the rear end surface 32b of the flat plate portion 32 through the second bar-shaped light guide body 52 by each of the reflective elements 34s while guiding from the base end portion of each of the curved portions 34 to the tip end side.

Further, in the embodiment, it is possible to make the left end surface 34d of the pair of upper and lower curved portions 34 appear to emit light as a bunch of optical fibers branched from the bundle of the optical fibers.

Descriptions have been made on the case where the vehicle lamp 10 is a tail lamp in the first embodiment. However, in addition to the tail lamp, similar operational effects as in the first embodiment may be obtained in, for example, a stop lamp, a turn signal lamp, a clearance lamp, and daytime running lamp, by adopting the same configuration as in the first embodiment regardless of the locations provided in the vehicle or the function thereof. At this time, for example, it is possible to configure the vehicle lamp 10 as a tail lamp and stop lamp, and then, to turn ON the light source 40 in a tail lamp turning ON mode and additionally turn ON the second light source 50 in a stop lamp turning ON mode.

Next, a modification of the first embodiment will be described.

First, a first modification of the first embodiment will be described.

Figure 7:
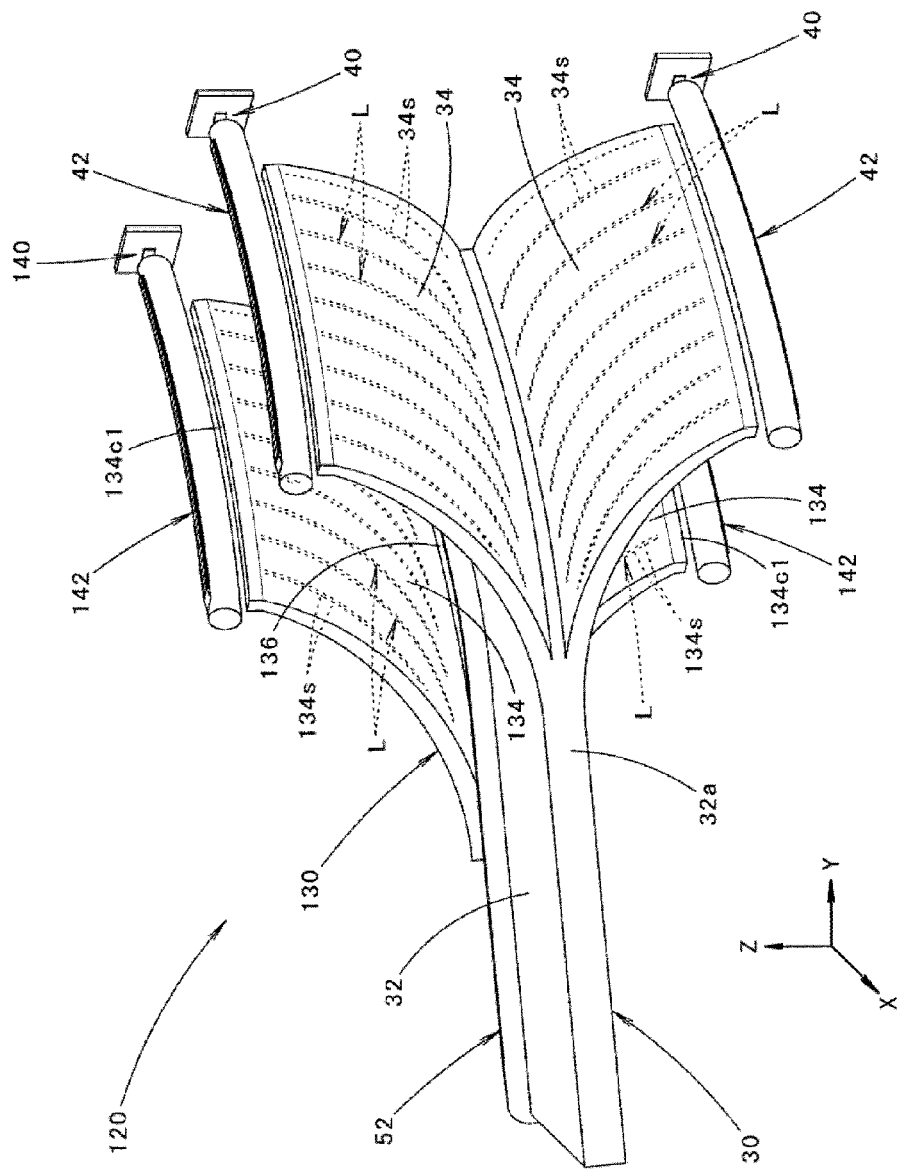
FIG. 7 is a view illustrating a first modification of the first embodiment, which is similar to FIG. 3.

FIG. 7 is a view illustrating a lamp unit 120 according to the modification, which is similar to FIG. 3.

As illustrated in the drawing, the basic configuration of the modification is the same as the case of the first embodiment, but as a configuration of the lamp unit 120, the configuration is different from that of the first embodiment in that a plate-shaped light guide body 130, and a pair of upper and lower light sources 140 and bar-shaped light guide bodies 142 are additionally disposed on the rear side of the lamp of the plate-shaped light guide body 30.

The plate-shaped light guide body 130 has a configuration in which a pair of upper and lower curved portions 134 having the same configuration as the pair of upper and lower curved portions 34 in the plate-shaped light guide body 30 are integrally formed via a connecting portion 136. At this time, the curved portion 134 positioned on the upper side is disposed in a state of being shifted obliquely upward to the left with respect to the curved portion 34 positioned on the upper side, and the curved portion 134 positioned on the lower side is disposed in a state of being shifted obliquely downward to the left with respect to the curved portion 34 positioned on the lower side.

The pair of upper and lower light sources 140 and bar-shaped light guide bodies 142 have the same configuration as in the pair of upper and lower light sources 40 and bar-shaped light guide bodies 42, and the positional relationships with the pair of upper and lower curved portions 134 are set in the same manner as the pair of upper and lower light sources 40 and bar-shaped light guide bodies 42.

Figure 8:
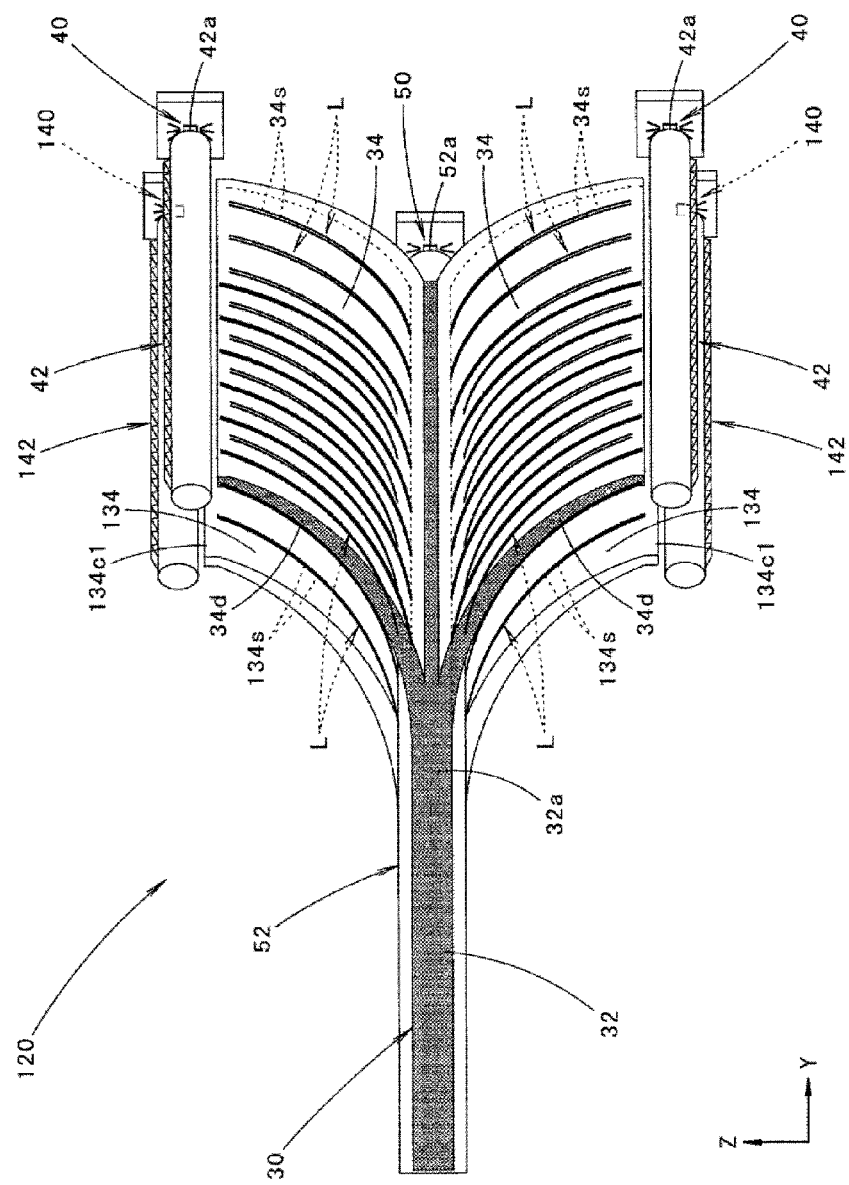
FIG. 8 is a view illustrating an operation of the first modification, which is similar to FIG. 6.

FIG. 8 is a front view illustrating the lamp unit 120 in a state where the lamp is turned ON.

As illustrated in the drawing, when the lamp unit 120 in which the pair of upper and lower light sources 40 and the second light source 50, and the pair of upper and lower light sources 140 are turned ON is observed from the front direction of the lamp, a plurality of reflective elements 134s formed on the pair of upper and lower curved portions 134 on the plate-shaped light guide body 130 appear to emit light, together with the front end surface 32a of the flat plate portion 32 of the plate-shaped light guide body 30 and the plurality of reflective elements 34s formed on the pair of upper and lower curved portions 34 and the left end surface 34d of the plate-shaped light guide body 30.

At this time, the plurality of reflective elements 134s formed on each of the curved portions 134 of the plate-shaped light guide body 130 make each of the lines L emit light substantially uniformly over the entire length by totally reflecting the light from the light source 140 that is incident on a tip end surface 134c1 of the curved portion 134 through the bar-shaped light guide body 142 by each of the reflective elements 134s while guiding to the base end side.

By adopting the configuration of the modification, since portions where appear to emit light linearly along the plurality of lines L in each of the plate-shaped light guide bodies 30 and 130 are present at two positions in the front-rear direction of the lamp, it is possible to produce a light emission state having feeling of depth at the time of turning ON the lamp.

The first modification has been described in which the plate-shaped light guide body 130 is disposed on the rear side of the lamp of the plate-shaped light guide body 30. However, it is also possible to adopt a configuration in which another plate-shaped light guide body is disposed on the rear side of the lamp of the plate-shaped light guide body 130.

Next, a second modification of the first embodiment will be described.

Figure 9:
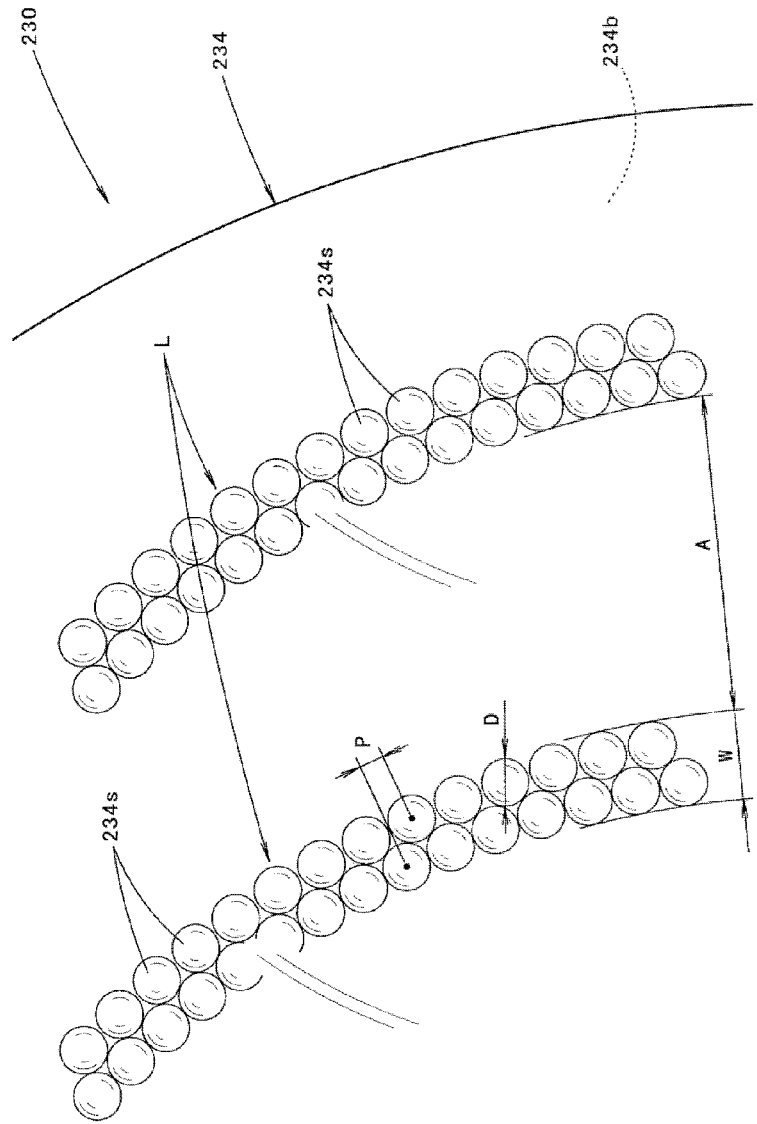
FIG. 9 is a view illustrating a second modification of the first embodiment, which is similar to FIG. 4.

FIG. 9 is a view illustrating a main part of a plate-shaped light guide body 230 according to the modification, which is similar to FIG. 4.

As illustrated in FIG. 9, the basic configuration of the modification is the same as the case of the first embodiment, but it is different from the case of the first embodiment in that a plurality of reflective elements 234s formed on a first plate surface 234b of the curved portion 234 of the plate-shaped light guide body 230 are disposed in a state of being continuously arranged in two rows along each of the plurality of lines L.

In the modification, each of the reflective elements 234s has a concave spherical surface shape as in the case of the first embodiment, and an outer peripheral edge shape thereof is set to a circular shape of the same size.

At this time, the plurality of reflective elements 234s positioned on an inner circumferential side on each of the lines L are disposed in a state of being closely adhered to each other in a direction in which each of the lines L extends. Further, the plurality of reflective elements 234s positioned on an outer circumferential side on each of the lines L are disposed in a state of being shifted by a half pitch in the direction in which each of the lines L extends with respect to the plurality of reflective elements 234s positioned on the inner circumferential side and in a state of being closely adhered to the plurality of reflective elements 234s positioned on the inner circumferential side. Accordingly, the plurality of reflective elements 234s positioned on the outer circumferential side are disposed in a state of being slightly separated each other in the direction in which each of the lines L extends.

Therefore, each of the lines L has a width W substantially twice the outer diameter D of each of the reflective elements 234s, and the plurality of reflective elements 234s are disposed alternately at a pitch P which is the half of the outer diameter D of each of the reflective elements 234s. At this time, in a case where the width W is set to the same value as in the case of the first embodiment, the outer diameter D of each of the reflective elements 234s may be set to a value which is substantially half of that in the first embodiment.

Also in the modification, an interval A between the plurality of lines L in the required direction is set to a value (e.g., A=about 2 W to 10 W) larger than the width W of each of the lines L.

As in the modification, when the plurality of reflective elements 234s are disposed in a state of being arranged in parallel in pairs on the line in the direction that intersects with the required direction, it is possible to make each of the lines L appear to emit light with more uniform brightness.

In particular, as in the modification, when the plurality of reflective elements 234s positioned on the inner circumferential side and the plurality of reflective elements 234s positioned on the outer circumferential side are disposed to be closely adhered alternately in a state of being shifted by a half pitch in the direction in which each of the lines L extends, it is possible to make each of the lines L appear to emit light with more uniform brightness and also more brightly.

Next, a third modification of the first embodiment will be described.

Figure 10A:
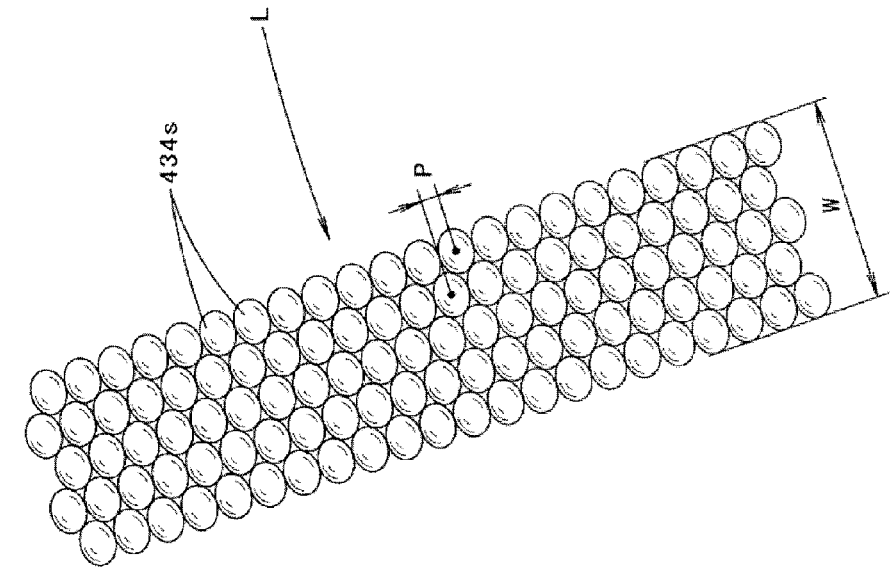
FIGS. 10A and 10B are views illustrating a third modification and a fourth modification of the first embodiment, which are similar to FIG. 4.

FIG. 10A is a view illustrating a main part of a plate-shaped light guide body according to the modification, which is similar to FIG. 4.

As illustrated in FIG. 10A, the basic configuration of the modification is the same as the case of the first embodiment, but in the modification, it is different from the case of the first embodiment in that a plurality of reflective elements 334s are disposed in a state of being continuously arranged in five rows along a line that linearly extends.

In the modification, each of the reflective elements 334s has a concave spherical surface shape as in the case of the first embodiment, and an outer peripheral edge shape thereof is set to a circular shape of the same size.

At this time, the plurality of reflective elements 334s that constitutes each of the rows in the line L are disposed in a state of being closely adhered to each other in a direction in which the line L extends, and also, in a state of being closely adhered in a state of being shifted by a half pitch in the direction in which the line L extends between the rows that are adjacent to each other.

Therefore, the line L has a width W substantially five times the outer diameter D of each of the reflective elements 334s, and the plurality of reflective elements 334s are disposed at a pitch P which is the half of the outer diameter D of each of the reflective elements 334s. At this time, in a case where the width W is set to the same value as in the case of the first embodiment, the outer diameter D of each of the reflective elements 334s may be set to a value which is substantially ⅕ of that in the first embodiment.

As in the modification, when the plurality of reflective elements 334s are disposed in a state where five reflecting elements 334s are disposed in parallel on the line L in the direction that intersects the required direction, and also, the reflective elements 334s are disposed in a state of being shifted by a half pitch in the direction in which the line extends between the rows adjacent to each other, it is possible to make the line L appear to emit light with far more uniform brightness and also far more brightly.

Next, a fourth modification of the first embodiment will be described.

Figure 10B:
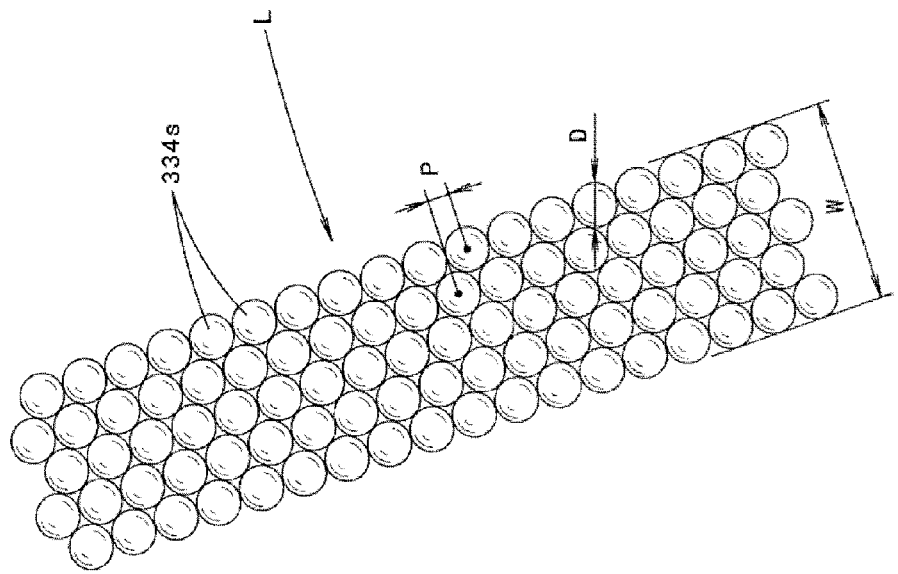

FIG. 10B is a view illustrating a main part of a plate-shaped light guide body according to the modification, which is similar to FIG. 4.

As illustrated in FIG. 10B, the basic configuration of the modification is the same as the case of the third modification, but in the modification, it is different from the case of the third modified embodiment in that the surface shape of each of the reflective elements 434s is set to a concave elliptic spherical surface shape.

At this time, each of the reflective elements 434s has an elliptical shape elongated in a direction orthogonal to the direction in which the line L extends, and every reflective element is formed in the same size.

As in the modification, by adopting the configuration in which each of the reflective elements 434s has the elliptical shape elongated in the direction orthogonal to the direction in which the line L extends, it is possible to make the line L appear to emit light with more uniform brightness and also more brightly than as the case of the third modification.

Next, a second embodiment of the present disclosure will be described.

Figure 11:
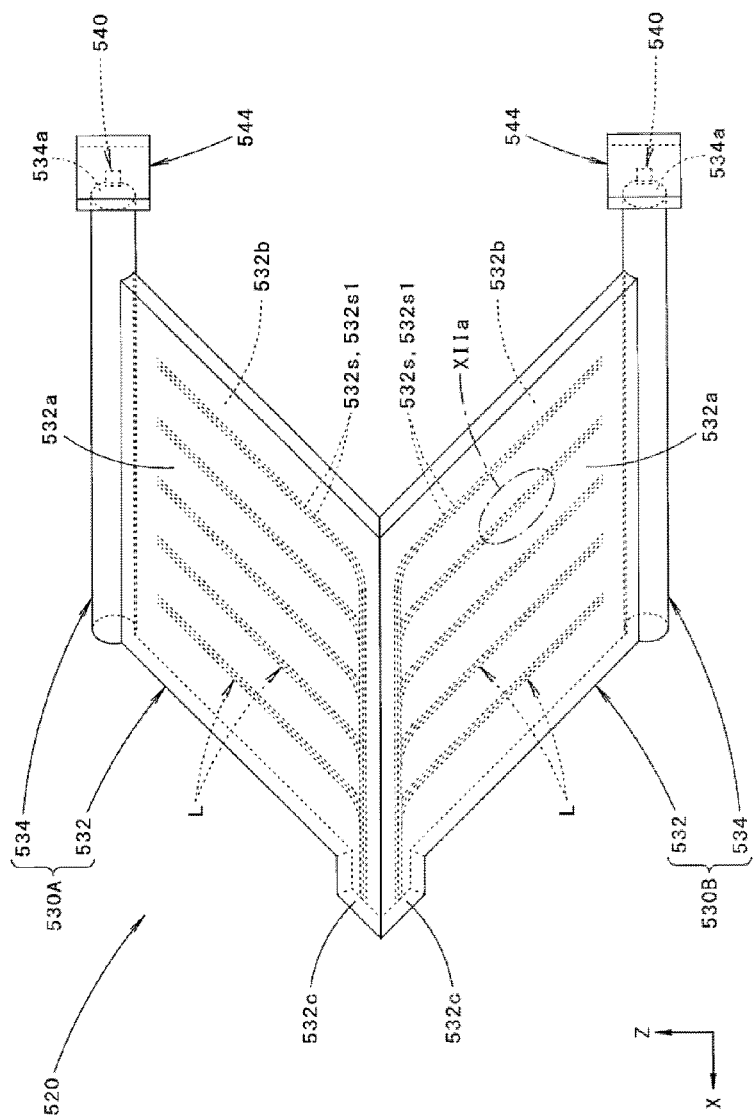
FIG. 11 is a side view illustrating a lamp unit of a vehicle lamp according to a second embodiment of the present disclosure.

FIG. 11 is a side view illustrating a lamp unit 520 according to the embodiment.

The lamp unit 520 according to the embodiment is also a lamp unit that is incorporated to a tail lamp disposed at the right side rear end portion of a vehicle and includes a pair of upper and lower light guide units 530A and 530B and a pair of upper and lower light sources 540. The lamp unit 520 has a vertically symmetrical configuration.

Each of the light guide units 530A and 530B is a member made of a transparent resin (e.g., acrylic resin), and has a configuration in which a plate-shaped light guide body 532 and a bar-shaped light guide body 534 are integrally formed.

First, a configuration of the light guide unit 530A positioned on the upper side will be described.

The plate-shaped light guide body 532 is formed in a flat plate shape, and is disposed in a state of being inclined to the rear side of the lamp from the left end portion thereof toward the right end portion and in a state of being inclined to the rear side of the lamp from the lower end portion toward the upper end portion. The plate-shaped light guide body 532 is formed with a constant vertical width and a constant lateral width, but a protruding portion 532c that protrudes in the left direction is formed at the left side lower end portion thereof.

The bar-shaped light guide body 534 is formed in a cylindrical shape, and linearly extends in a horizontal direction along the upper end edge of the plate-shaped light guide body 532. A left end surface of the bar-shaped light guide body 534 is formed on the same plane as the left end surface of the plate-shaped light guide body 532, but a right end surface 534a thereof is positioned on a right side beyond the right end surface of the plate-shaped light guide body 532.

A second plate surface 532a that constitutes the front surface of the plate-shaped light guide body 532 is formed in a planar shape, but a plurality of reflective elements 532s and a plurality of auxiliary reflective elements 532s1 are formed on a first plate surface 532b that constituted the rear surface thereof. At this time, the plurality of reflective elements 532s and the plurality of auxiliary reflective elements 532s1 are disposed in a state of being continuously arranged side by side along lines L extending in a required direction, respectively.

The required direction is set obliquely upward from the lower end portion of the plate-shaped light guide body 532 toward the upper end portion, and the lines L linearly extend from the vicinity of the lower end edge of the plate-shaped light guide body 532 to the vicinity of the upper end edge. A plurality (e.g., five) of lines L are disposed substantially at equal intervals in a horizontal direction that intersects with the required direction. The plurality of lines L are merged with each other at the lower end portion of the plate-shaped light guide body 532 to the left direction in a curved state, and extend in the horizontal direction to the protruding portion 532c as a single line.

The specific disposition and the specific shape of the plurality of reflective elements 532s and the plurality of auxiliary reflective elements 532s1 on each of the lines L will be described later.

A light source 540 positioned on the upper side is disposed in the vicinity of a right end surface 534a of the bar-shaped light guide body 534 of the light guide unit 530A. The light source 540 is a red light emitting diode, and is mounted on a substrate 544 in a state where the emitting surface thereof faces the right end surface 534a of the bar-shaped light guide body 534.

The bar-shaped light guide body 534 is configured to cause a part of the light from the light source 540 that is incident on the right end surface 534a to be incident on the plate-shaped light guide body 532, in a process of guiding the light toward the left end surface thereof while totally reflecting from the peripheral surface.

Then, the plate-shaped light guide body 532 is configured to totally reflect the light that is incident on the bar-shaped light guide body 534 by the plurality of reflective elements 532s and the plurality of auxiliary reflective elements 532s1 formed on the first plate surface 532b while guiding the light toward the lower end portion of the plate-shaped light guide body 532, so as to emit from the second plate surface 532a toward the front of the lamp.

The light guide unit 530B positioned on the lower side has the same configuration as that of the light guide unit 530A positioned on the upper side.

Then, the pair of upper and lower light guide units 530A and 530B is integrated by, for example, bonding or welding in a state where the lower end surface of the plate-shaped light guide body 532 of the light guide unit 530A and the upper end surface of the plate-shaped light guide body 532 of the light guide unit 530B are abutted.

FIG. 12A is a view illustrating a XIIa portion (that is, a main part of the plate-shaped light guide body 532 of the light guide unit 530B positioned on the lower side) of FIG. 11 viewed from the rear side of the lamp. Further, FIG. 12B is a cross-sectional view taken along a line b-b of FIG. 12A, and FIG. 12C is a cross-sectional view taken along a line c-c of FIG. 12A.

As illustrated in FIG. 12A, the plurality of reflective elements 532s and the plurality of auxiliary reflective elements 532s1 formed on the first plate surface 532b of the plate-shaped light guide body 532 are disposed in a state of being continuously arranged in three rows along the line L.

At this time, the plurality of auxiliary reflective elements 532s1 disposed along the line L are disposed in a state of being sandwiched from both sides by the plurality of reflective elements 532s disposed along the line L.

The plurality of reflective elements 532s that constitute each of the rows on both sides are disposed in a state of being closely adhered to each other on the line L.

Each of the reflective elements 532s has a concave spherical surface shape as the reflective elements 34s in the first embodiment and an outer peripheral edge shape thereof is set to a circular shape of the same size.

Meanwhile, as illustrated in FIG. 12B, the plurality of auxiliary reflective elements 532s1 that constitute a center row is formed in a stepped manner with respect to the direction in which the line L extends, and are disposed in a state of being substantially closely adhered to each other on the line L.

Each of the auxiliary reflective elements 532s1 has a rectangular outer shape elongated in the direction in which the line L extends, and a length of the longer side thereof is set to about twice the diameter of the reflective element 532s. Then, each of the auxiliary reflective elements 532s1 has an oblique planar portion 532s1a formed along a plane inclined downward from the first plate surface 532b.

As illustrated in FIGS. 12B and 12C, in the plate-shaped light guide body 532 of the light guide unit 530B positioned on the lower side, the light from the light source 540 that is incident on the bar-shaped light guide body 534 connected the lower end edge thereof is guided upward (that is, toward the upper edge of the plate-shaped light guide body 532), and reaches each of the reflective elements 532s or each of the auxiliary reflective elements 532s1 during being guided.

At this time, as illustrated in FIG. 12C, the light that reaches each of the reflective elements 532s is diffusely reflected by the total reflection from the surface of the concave spherical surface shape thereof, and is emitted as the light largely diffused from the second plate surface 532a toward the front of the lamp.

Meanwhile, as illustrated in FIG. 12B, the light that reaches each of the auxiliary reflective elements 532s1 is specularly reflected by the total reflection from the oblique planar portion 532s1a thereof, and is emitted as the light having directionality close to the parallel light from the second plate surface 532a toward the front of the lamp.

Next, the operational effects of the present embodiment will be described.

The lamp unit 520 according to the embodiment has the pair of upper and lower light guide units 530A and 530B, but the plurality of reflective elements 532s are disposed on the first plate surface 532b of the plate-shaped light guide body 532 thereof in a state of being continuously arranged along the line that extends in the required direction and the plurality of auxiliary reflective elements 532s1 are disposed in a position adjacent to the plurality of reflective elements 532s in a state of being continuously arranged along the line L, and the plurality of auxiliary reflective elements 532s1 are formed in a stepped manner with respect to the direction in which the line extends. Thus, the following operational effect may be obtained.

That is, since the plurality of auxiliary reflective elements 532s1 are additionally disposed on the first plate surface 532b of the plate-shaped light guide body 532 in a state of being continuously arranged along the line L, it is possible to make emitted light have directionality when the light from the light source 540 that is incident on the plate-shaped light guide body 532 is totally reflected from each of the auxiliary reflective elements 532s1 and emitted from the second plate surface 532a toward the front of the lamp, and thus, it is easily possible to enhance the light distribution performance as the vehicle lamp.

At this time, since the plurality of auxiliary reflective elements 532s1 are disposed along the line L at positions adjacent to the plurality of reflective elements 532s disposed along the line L, it is possible to maintain the produced effect on the design property that makes an optical fiber appear to emit light at the time of turning ON the lamp, and additionally, to enhance the light distribution performance as the vehicle lamp.

Further, in the embodiment, since the plurality of auxiliary reflective elements 532s1 disposed along the line L are disposed in a state of being sandwiched from the both sides by the plurality of reflective elements 532s disposed along the line L, it is possible to enhance the produced effect on the design property that makes an optical fiber appear to emit light at the time of turning ON the lamp, and additionally, to enhance the light distribution performance as the vehicle lamp.

As in the embodiment, it is possible to apply the configuration, in which the plurality of auxiliary reflective elements 532s1 are disposed in a state of being continuously arranged along the line L at positions adjacent to the plurality of reflective elements 532s disposed in a state of being continuously arranged along the line, to the lamp unit 20 of the first embodiment. Thus, it is possible to obtain the same operational effects to the embodiment.

The bar-shaped light guide body 534 has been described to be formed in the cylindrical shape in the second embodiment, but it is possible to adopt a configuration in which the plurality of reflective elements are continuously formed in the longitudinal direction on the outer circumferential surface thereof.

The plate-shaped light guide body 532 has been described to be formed in the flat plate shape in the second embodiment, but it is possible to be formed along a curved surface.

Each of the auxiliary reflective elements 532s1 has been described to have the oblique planar portion 532s1a in the second embodiment, but it is possible to have an oblique curved surface portion formed along a curved surface inclined downward from the first plate surface 532b instead of the oblique planar portion 532s1a. In this case, the directionality of the emitted light from the second plate surface 532a of the plate-shaped light guide body 532 is weakened, but it is possible to suppress occurrence of uneven light distribution.

Next, a first modification of the second embodiment will be described.

FIG. 13A is a view illustrating a main part of a plate-shaped light guide body according to the modification, which is similar to FIG. 12A.

As illustrated in FIG. 13A, the basic configuration of the modification is the same as the case of the second embodiment, but in the modification, it is different from the case of the second embodiment in that one row of a further plurality of reflective elements 632s is additionally disposed on both sides of the plurality of reflective elements 632s disposed along the line L in a state of sandwiching a plurality of auxiliary reflective elements 632s1 disposed along the line L therebetween.

At this time, the plurality of reflective elements 632s that constitute each of the rows additionally disposed are disposed in a state of being shifted by a half pitch in the direction in which the line L extends with respect to the plurality of reflective elements 632s disposed inside.

As in the modification, with a configuration in which the plurality of reflective elements 632s are disposed in two rows on the line L so as to sandwich the plurality of auxiliary reflective elements 632s1 arranged along the line L, it is possible to make the line L appear to emit light with far more uniform brightness and also far more brightly.

At this time, since the plurality of reflective elements 632s that constitute each of the rows additionally disposed are disposed in a state of being shifted by a half pitch in the direction in which the line L extends with respect to the plurality of reflective elements 632s that constitute the inside row, it is possible to suppress the width of the line L from being widened due to the additional arrangement of the plurality of reflective elements 632s on the line L.

Next, a second modification of the second embodiment will be described.

FIG. 13B is a view illustrating a main part of a plate-shaped light guide body according to the modification, which is similar to FIG. 12A.

As illustrated in FIG. 13B, the basic configuration of the modification is the same as the case of the second embodiment, but in the modification, it is different from the case of the second embodiment in that a plurality of auxiliary reflective elements 732s1 are disposed in 2 rows along the line L and a plurality of reflective elements 732s are disposed in three rows along the line L so as to sandwich the each row of the plurality of auxiliary reflective elements 732s1 therebetween.

As in the modification, an amount of light that has directionality emitted from the plate-shaped light guide body toward the front of the lamp may be increased by adopting the configuration in which the plurality of auxiliary reflective elements 732s1 are disposed in two rows along the line L. Thus, it is possible to further enhance the light distribution performance as the vehicle lamp.

Further, in the modification, since the plurality of reflective elements 732s are disposed in three rows along the line so as to sandwich the each row of the plurality of auxiliary reflective elements 732s1 therebetween, it is possible to further enhance the produced effect on the design property that make an optical fiber appear to emit light at the time of turning ON the lamp.

Next, a third modification of the second embodiment will be described.

FIG. 13C is a view illustrating a main part of a plate-shaped light guide body according to the modification, which is similar to FIG. 12A.

As illustrated in FIG. 13C, the basic configuration of the modification is the same as the case of the second embodiment, but in the modification, it is different from the case of the second embodiment in that a plurality of auxiliary reflective elements 832s1 and a plurality of reflective elements 832s disposed along the line L so as to sandwich the plurality of auxiliary reflective elements 832s1 therebetween are disposed in a state of being shifted by a half pitch in the direction in which the line L extends.

Further, in the modification, it is different from the case of the second embodiment in that each of the auxiliary reflective elements 832s1 has a substantially rhombic outer shape with rhombic angles. At this time, a width between the sides facing each other in the substantially rhombic shape is set to a value slightly larger than a diameter of each of the reflective elements 832s.

The plurality of auxiliary reflective elements 832s1 is formed in a stepped manner with respect to the direction in which the line L extends as in the second embodiment, and each of the auxiliary reflective elements 832s1 has an oblique planar portion 832s1a.

In the modification, since the plurality of auxiliary reflective elements 832s1 and the plurality of reflective elements 832s are disposed in the state of being shifted by the half pitch in the direction in which the line L extends, the plurality of auxiliary reflective elements 832s1 are disposed in a state of being substantially closely adhered to each other on the line L, while the plurality of reflective elements 832s are disposed with a certain interval (specifically, a value of half of the diameter of each of the reflective elements 832s or less) in the direction in which the line L extends.

As in the modification, since the plurality of auxiliary reflective elements 832s1 disposed along the line L and the plurality of reflective elements 832s disposed along the line L so as to sandwich the plurality of auxiliary reflective elements 832s1 therebetween are disposed in the state of being shifted by the half pitch in the direction in which the line L extends, it is possible to suppress the width of the line L from being widened due to the additional disposition of the plurality of reflective elements 832s1 on the line L.

In the modification, although the plurality of reflective elements 832s are disposed with a certain interval in the direction in which the line L extends, it is possible to make the plate-shaped light guide body appear to emit light linearly by the light from the light source that is totally reflected by the plurality of reflective elements 832s, since the interval is set to a value of half of the diameter of each of the reflective elements 832s or less.

Next, a fourth modification of the second embodiment will be described.

Figure 14:
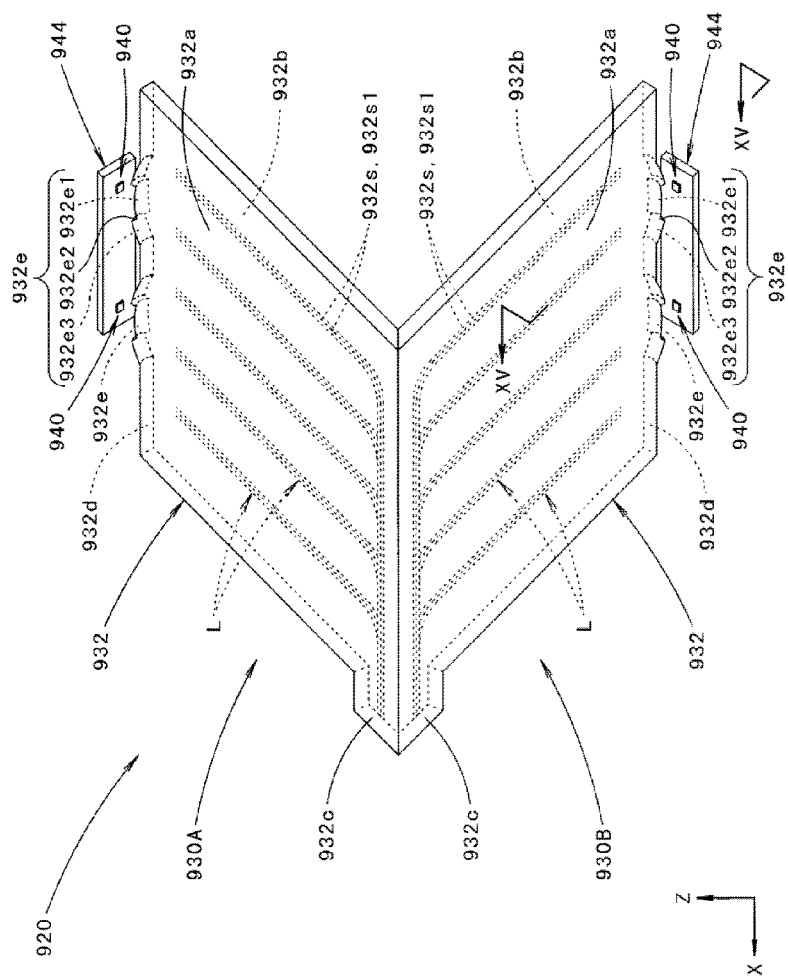
FIG. 14 is a view illustrating a fourth modification of the second embodiment, which is similar to FIG. 11.

FIG. 14 is a view illustrating a lamp unit 920 according to the modification, which is similar to FIG. 11.

The basic configuration of the modification is the same as the case of the second embodiment, but in the modification, it is different from the case of the second embodiment in that each of light guide units 930A and 930B is only constituted by a plate-shaped light guide body 932 (that is, the bar-shaped light guide body 534 in the second embodiment is not included), light from two light sources 940 is directly incident on the plate-shaped light guide body 932 of each of the light guide units 930A and 930B, respectively.

That is, also in the modification, in the plate-shaped light guide body 932 of each of the light guide units 930A and 930B, a second plate surface 932a that constitutes the front surface is formed in a planar shape, a plurality of reflective elements 932s and a plurality of auxiliary reflective elements 932s1 are formed on a first plate surface 932b, and a protruding portion 932c is formed at the left lower end portion, as the plate-shaped light guide body 532 in the second embodiment.

Meanwhile, two light sources 940 are disposed with a constant interval in the vicinity of an upper side end surface 932d of the plate-shaped light guide body 932 of the light guide unit 930A positioned on the upper side. Although a configuration of each of the light sources 940 is the same as the light source 540 in the second embodiment, the light source 940 is mounted on a common substrate in a state where a light emitting surface thereof faces the end surface 932d of the plate-shaped light guide body 932.

Then, a light incidence portion 932e configured to cause the light from the light source 940 to be incident on the plate-shaped light guide body 932 as light close to parallel light is formed at positions corresponding to each of the light sources 940 on the end surface 932d of the plate-shaped light guide body 932.

The light incidence portion 932e includes a first incidence portion 932e1 that causes the light from the light source 940 to be incident so as to be reflected to the lower end side of the plate-shaped light guide body 932, a pair of second incidence portions 932e2 that causes the light from the light source 940 to be incident so as to be reflected to the side direction at both sides of the first incidence portion 932e1, and a pair of reflective portions 932e3 that internally reflects the light from the light source 940 that is incident to the second incidence portion 932e2 toward the lower end side by total reflection, in a region close to the front of the light source 940.

The light guide unit 930B and the two light sources 940 positioned on the lower side have a configuration in which the light guide unit 930A and the two light sources 940 positioned on the upper side are vertically reversed.

Figure 15A:
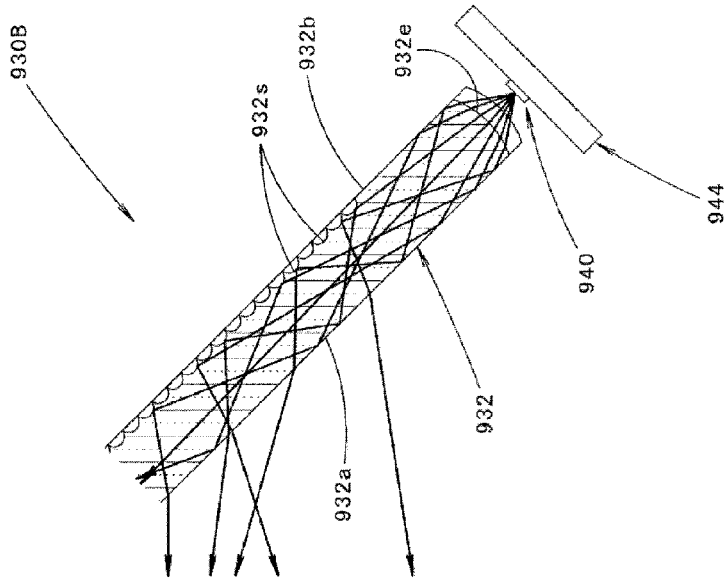
FIGS. 15A and 15B are cross-sectional views taken along a line XV-XV of FIG. 14.
Figure 15B:
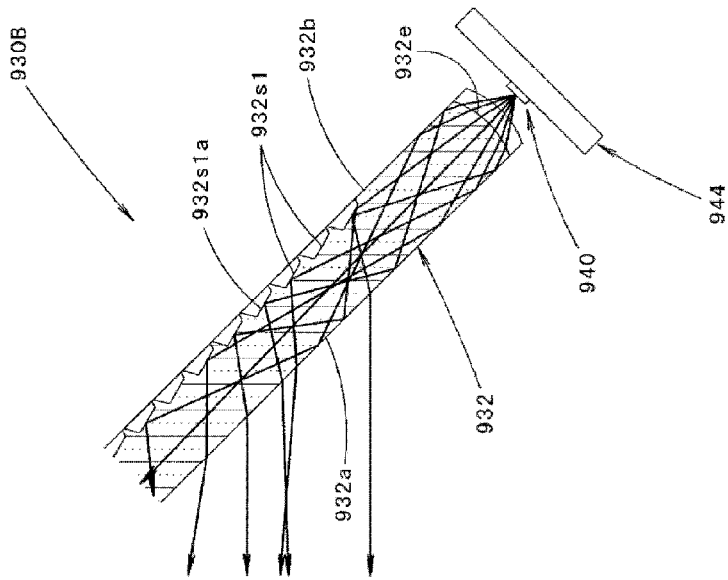

FIGS. 15A and 15B are cross-sectional views taken along a line XV-XV of FIG. 14, and FIG. 15A is a view illustrating a cross-sectional shape of the auxiliary reflective element 932s1, and FIG. 15B is a view illustrating a cross-sectional shape of the reflective element 932s.

As illustrated in FIGS. 15A and 15B, in the plate-shaped light guide body 932 of the light guide unit 930B positioned on the lower side, the light from the light source 940 that is incident on the light incidence portion 932e formed on the end surface 932d on the lower side is guided upward (that is, toward the upper edge of the plate-shaped light guide body 932), and reaches each of the reflective elements 932s or each of the auxiliary reflective elements 932s1 during being guided.

At this time, as illustrated in FIG. 15B, the light that reaches each of the reflective elements 932s is diffusely reflected by the total reflection from the surface of the concave spherical surface shape, and is emitted as the light largely diffused from the second plate surface 932a toward the front of the lamp.

Meanwhile, as illustrated in FIG. 15A, the light that reaches each of the auxiliary reflective elements 932s1 is specularly reflected by the total reflection from the oblique planar portion 932s1a thereof, and is emitted as the light having directionality close to the parallel light from the second plate surface 932a toward the front of the lamp.

In a case where the configuration of the modification is adopted, it is easily possible to enhance the light distribution performance as a vehicle lamp by totally reflecting the light from the light source 940 that is incident on the plate-shaped light guide body 932 from each of the auxiliary reflective elements 932s1 and emitting from the second plate surface 932a toward the front of the lamp.

Further, in the modification, since the plurality of auxiliary reflective elements 532s1 are disposed in a state of being sandwiched from the both sides by the plurality of reflective elements 532s, it is possible to enhance the produced effect on the design property that makes an optical fiber appear to emit light at the time of turning ON the lamp, and additionally, to enhance the light distribution performance as the vehicle lamp.

At this time, in the modification, since the light from each of the two light sources is directly incident on the plate-shaped light guide body 932 of each of the light guide units 930A and 930B, it is possible to make the optical fibers appear to emit light more brightly at the time of turning ON the lamp. In addition, it is possible to further enhance the light distribution performance as the vehicle lamp.

Next, a third embodiment of the present disclosure will be described.

Figure 16:
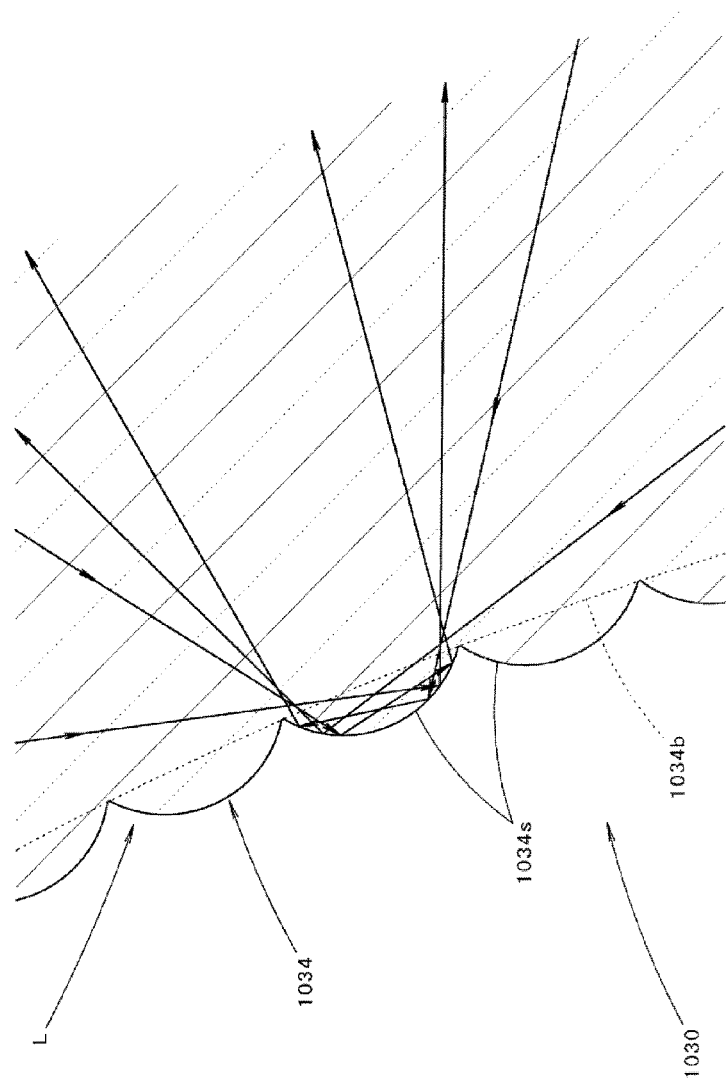
FIG. 16 is a view illustrating a main portion of a plate-shaped light guide body of a lamp unit of a vehicle lamp according to a third embodiment of the present disclosure, which is similar to FIG. 5.

FIG. 16 is a view illustrating a main part of a plate-shaped light guide body 1030 according to the embodiment, which is similar to FIG. 5.

The basic configuration of the embodiment is the same as the case of the first embodiment, but a configuration of each of curved portions 1034 of the plate-shaped light guide body 1030 is partially different from the first embodiment.

That is, also in the plate-shaped light guide body 1030 according to the embodiment, a plurality of reflective elements 1034s formed on a first plate surface 1034b of each of the curved portions 1034 are disposed in a state of being continuously arranged in one row along each of the plurality of lines L, in a state of being closely adhered to each other on each of the lines L.

However, in the embodiment, each of the reflective elements 1034s has a convex spherical surface shape, and an outer peripheral edge shape thereof is set to a circular shape of the same size.

As illustrated in FIG. 16, in the curved portion 1034 positioned in the lower side, the light from the light source 40 (see, e.g., FIG. 1) is guided upward and the light from the second light source 50 (see, e.g., FIG. 1) is guided downward 4, and these lights reach each of the reflective elements 1034s. At this time, since the lights from the light source 40 and the second light source 50 reach each of the reflective elements 1034s from directions other than the directions in the cross section illustrated in FIG. 16, these lights are totally reflected in every direction by each of the reflective elements 1034s.

Therefore, also in a case where the configuration of the embodiment is adopted, it is possible to obtain substantially the same operational effects to the first embodiment.

Numeric values shown as specifications in each of the above embodiments and the modifications thereof are merely illustrative, and different values may be, of course, set as appropriate.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising a plate-shaped light guide body having a first plurality of curved portions extending outwardly from a front end surface of the plate-shaped light guide body towards a front side of a vehicle lamp and a first bar-shaped light guide body disposed along a tip end surface of each first curved portion,
    wherein each first curved portion is configured to reflect light from a first light source positioned adjacent to an end surface of the first bar-shaped light guide body by a first plurality of reflective elements formed on a first plate surface of the first curved portion, and then, to emit the light from a second plate surface of the first curved portion toward the front side of the vehicle lamp,
    the plurality of reflective elements are disposed in a state of being continuously arranged along a line extending in a predetermined direction along a curvature of each curved portion, and
    each of the reflective elements has a substantially concave spherical surface shape or a substantially convex spherical surface shape.

2. The vehicle lamp of claim 1, wherein the first plurality of reflective elements are disposed in a state of being arranged in parallel pairs along the line in a direction that coincides with the predetermined direction.

3. The vehicle lamp of claim 1, wherein at least a region where the first plurality of reflective elements are formed is formed in a curved surface shape on the first plate surface.

4. The vehicle lamp of claim 2, wherein at least a region where the first plurality of reflective elements are formed is formed in a curved surface shape on the first plate surface.

5. The vehicle lamp of claim 1, wherein a plurality of lines is disposed at intervals in a direction that coincides with the predetermined direction.

6. The vehicle lamp of claim 2, wherein a plurality of lines is disposed at intervals in a direction that coincides with the predetermined direction.

7. The vehicle lamp of claim 1, further comprising a second bar-shaped light guide body,
    wherein the second bar-shaped light guide body is disposed in a state of extending along a rear end surface of the plate-shaped light guide body,
    a second light source is disposed so as to cause light to be incident on the second bar-shaped light guide body, and
    the second bar-shaped light guide body is configured to cause the light from the second light source that is incident on the second bar-shaped light guide body to be incident on the plate-shaped light guide body from the rear end surface towards the front side of the vehicle lamp.

8. The vehicle lamp of claim 2, further comprising a second bar-shaped light guide body,
    wherein the second bar-shaped light guide body is disposed in a state of extending along a rear end surface of the plate-shaped light guide body,
    a second light source is disposed so as to cause light to be incident on the second bar-shaped light guide body, and
    the second bar-shaped light guide body is configured to cause the light from the second light source that is incident on the second bar-shaped light guide body to be incident on the plate-shaped light guide body from the rear end surface towards the front side of the vehicle lamp.

9. The vehicle lamp of claim 3, further comprising a second bar-shaped light guide body,
    wherein the second bar-shaped light guide body is disposed in a state of extending along a rear end surface of the plate-shaped light guide body,
    a second light source is disposed so as to cause light to be incident on the second bar-shaped light guide body, and
    the second bar-shaped light guide body is configured to cause the light from the second light source that is incident on the second bar-shaped light guide body to be incident on the plate-shaped light guide body from the rear end surface towards the front side of the vehicle lamp.

10. The vehicle lamp of claim 4, further comprising second a bar-shaped light guide body,
    wherein the second bar-shaped light guide body is disposed in a state of extending along a rear end surface of the plate-shaped light guide body,
    a second light source is disposed so as to cause light to be incident on the second bar-shaped light guide body, and
    the second bar-shaped light guide body is configured to cause the light from the second light source that is incident on the second bar-shaped light guide body to be incident on the plate-shaped light guide body from the rear end surface towards the front side of the vehicle lamp.

11. The vehicle lamp of claim 5, further comprising a second bar-shaped light guide body,
    wherein the second bar-shaped light guide body is disposed in a state of extending along a rear end surface of the plate-shaped light guide body,
    a second light source is disposed so as to cause light to be incident on the second bar-shaped light guide body, and
    the second bar-shaped light guide body is configured to cause the light from the second light source that is incident on the second bar-shaped light guide body to be incident on the plate-shaped light guide body from the rear end surface towards the front side of the vehicle lamp.

12. The vehicle lamp of claim 6, further comprising a second bar-shaped light guide body,
wherein the second bar-shaped light guide body is disposed in a state of extending along a rear end surface of the plate-shaped light guide body,
a second light source is disposed so as to cause light to be incident on the second bar-shaped light guide body, and
the second bar-shaped light guide body is configured to cause the light from the second light source that is incident on the second bar-shaped light guide body to be incident on the plate-shaped light guide body from the rear end surface towards the front side of the vehicle lamp.

13. The vehicle lamp of claim 1, wherein the first light source and the curved portions of the plate-shaped light guide body are disposed in a plurality of pairs at intervals in a front-rear direction of the lamp.

14. The vehicle lamp of claim 1, further comprising a second plurality of curved portions positioned rearward from the first plurality of curved portions and extending towards a front side of a vehicle lamp and a third bar-shaped light guide body disposed along a tip end surface of each second curved portion,
wherein each second curved portion is configured to reflect light from a third light source that is incident on the third bar-shaped light guide body by a second plurality of reflective elements formed on a third plate surface of the second curved portion, and then, to emit light from a fourth plate surface of the second curved portion toward the front side of the vehicle lamp.

15. The vehicle lamp of claim 1, wherein a plurality of auxiliary reflective elements are disposed on the first plate surface in a state of being continuously arranged along the line at positions adjacent to the plurality of reflective elements disposed along the line, and
the plurality of auxiliary reflective elements are formed in a stepped manner with respect to the predetermined direction.

16. The vehicle lamp of claim 15, wherein the plurality of auxiliary reflective elements disposed along the line are disposed in a state of being sandwiched from both sides in a direction that coincides with the predetermined direction by the plurality of reflective elements disposed along the line.

17. The vehicle lamp of claim 15, wherein the plurality of auxiliary reflective elements and the plurality of auxiliary reflective elements adjacent to each other on the line are disposed in a state of being shifted by a half pitch of the reflective elements with respect to the predetermined direction.

18. The vehicle lamp of claim 16, wherein the plurality of auxiliary reflective elements and the plurality of auxiliary reflective elements adjacent to each other on the line are disposed to be shifted by a half pitch of the reflective elements with respect to the predetermined direction.

\* \* \* \* \*